(12) United States Patent
Hilliard

(10) Patent No.: US 7,408,969 B2
(45) Date of Patent: Aug. 5, 2008

(54) OPTICAL CAVITY AND LASER

(76) Inventor: Donald Bennett Hilliard, 3050 N. Fontana, Tucson, AZ (US) 85705

( * ) Notice: Subject to any disclaimer, the term of this patent is extended or adjusted under 35 U.S.C. 154(b) by 509 days.

(21) Appl. No.: 10/968,280

(22) Filed: Oct. 18, 2004

(65) Prior Publication Data
US 2005/0163184 A1 Jul. 28, 2005

Related U.S. Application Data

(63) Continuation-in-part of application No. 09/839,254, filed on Apr. 20, 2001, now Pat. No. 6,807,216.

(60) Provisional application No. 60/236,446, filed on Sep. 29, 2000.

(51) Int. Cl.
*H01S 3/22* (2006.01)
*H01S 3/08* (2006.01)

(52) U.S. Cl. .......................... 372/57; 372/99

(58) Field of Classification Search ............ 372/57, 372/92, 94, 99
See application file for complete search history.

Primary Examiner—Armando Rodriguez

(57) ABSTRACT

A novel laser cavity structure is disclosed which pertains to laser resonator geometries possessing circular symmetry, such as in the case of disk or spherical lasers. The disclosed invention utilizes a very-high finesse Bragg reflector (VHF-BR) thin film reflectors of many layer pairs of very small refractive index difference, the VHF-BR deposited on a surface of revolution, thereby forming an optical cavity. These dielectric reflectors are disposed in such a way as to allow selection of preferred low order modes and suppression of parasitic modes while allowing a high cavity Q factor for preferred modes. The invention disclosed, in its preferred embodiments, is seen as particularly useful in applications requiring high efficiency in the production and coupling of coherent radiation. This is accomplished in a cavity design that is relatively compact and economical. Of particular novelty is the combination of the disclosed cavity design with polymer multilayers. The ability to deposit an unusually large number of polymer thin films without loss of specularity, while maintaining very low extinction, renders the disclosed polymer-based cavity particularly well-suited for higher mode discrimination, more rugged and light-weight cavities, as well as economical fabrication.

20 Claims, 36 Drawing Sheets

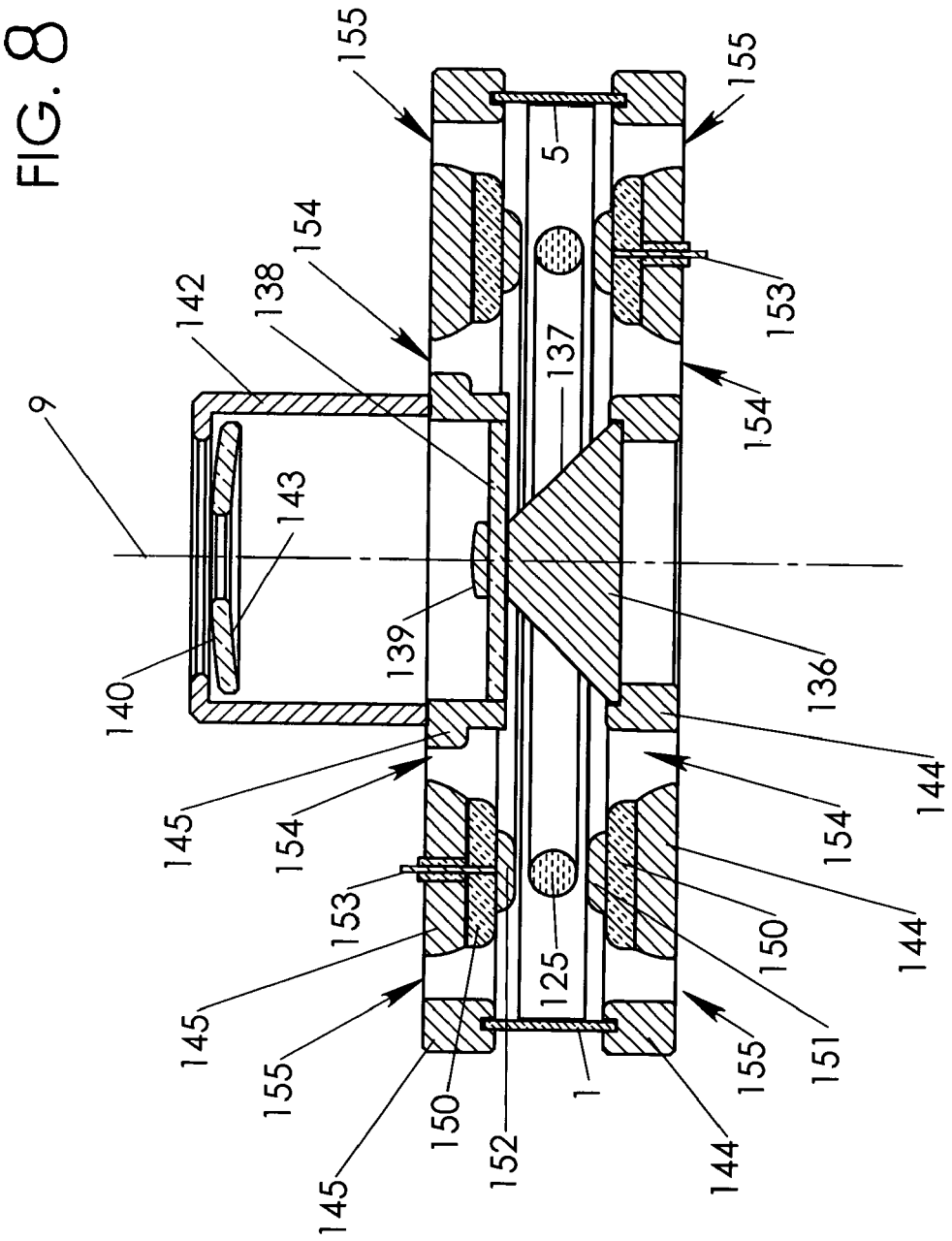

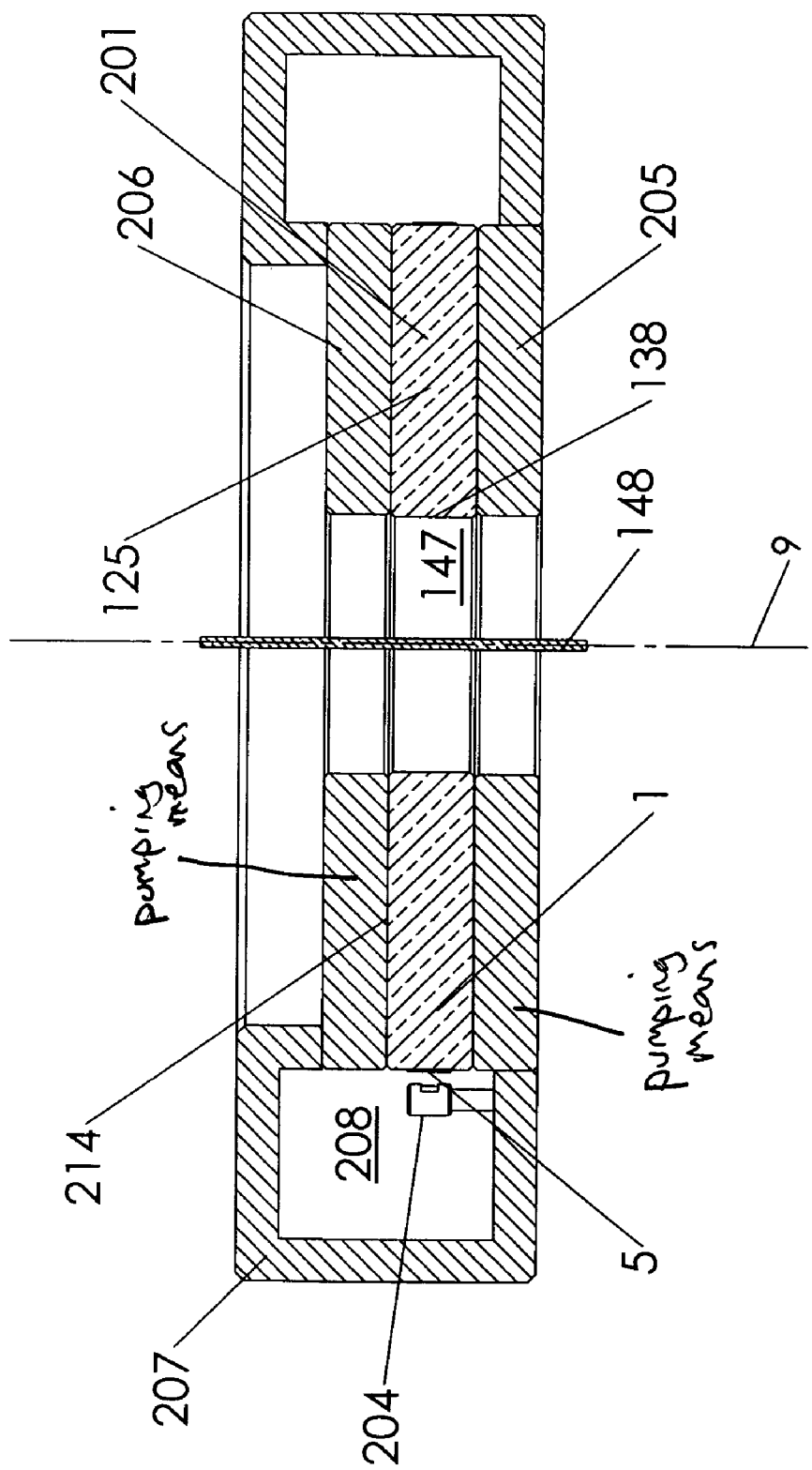

OPTICAL CAVITY AND LASER

RELATED APPLICATIONS

Continuation-in-part of U.S. application Ser. No. 09/839,254, filed Apr. 20, 2001 now U.S. Pat. No. 6,807,216 which claims benefit of U.S. Prov. Appl. No. 60/236,446, filed Sep. 29, 2000

BACKGROUND OF THE INVENTION

1. Field of the Invention

The present invention relates generally to the field of mode discrimination means in laser cavities, and in particular, mode discrimination in macroscopic cavities wherein a vast number of modes may otherwise be sustained.

2. Description of the Related Art

The present invention relates generally to the field of lasers and optical resonator design, and in particular, to the fields of disk and spherical lasers. Also, the invention relates to cavity structure designs that utilize multi-layer dielectric (MLD) thin film reflectors that provide a high degree of mode selection. Inventive matter disclosed herein is related to co-pending U.S. patent application Ser. No. 09/839,254, filed Apr. 20, 2001.

Laser cavities of the disk and spherical geometries have become an increasingly intensive field of research; in particular, for such lasers that are fabricated on a miniature or microscopic scale. In the latter case, the predominant means of cavity reflection is through total internal reflection (TIR), which provides an extremely high cavity Q. Such reflective means normally manifest in "whispering modes," which propagate at angles below the critical angle for TIR. These microdisk and microsphere lasers are very effective in cases involving evanescent coupling to an adjacent dielectric structure; however, they are known to contain a very large number of competing high-order modes. In addition, the coupling of these whispering modes for useful work is difficult for applications not utilizing evanescent coupling.

In recent years, theoretical studies have been performed on the development of derivation methods for cylindrical and spherical multilayer structures, which are aimed at providing an accurate description of the reflection coefficients and modal characteristics of these cavities. These studies address circular confinement structures with cavity dimensions on the order of the wavelengths studied. However, none of these studies are found to address the issues of applying similar circular Bragg reflectors for larger cavities of the scale used for gas and larger solid state cavities. Furthermore, these previous studies also entertain only the use of conventional MLD filters, with a large real refractive index difference, $n_H - n_L = \Delta n > 1$, for the layer pairs, and with an accordingly small number of layers required for high reflection.

The use of interference structures to enable high spectral resolving power in reflecting coatings has been described by Emmett (U.S. Pat. No. 4,925,259), wherein a very large number of alternating dielectric layers possessing a very small difference in refractive indices is used for application in high power flashlamps. The described coatings are utilized primarily for providing a high damage threshold to the high irradiance experienced in the flashlamp enclosure, as well as for obtaining a well-resolved pump wavelength for use in the described flashlamp.

The control of transverse modes in semiconductor lasers, primarily VCSEL's, has been reported by several research groups in the last decade. These latter reports utilize a circular Bragg grating structure as a complement to the planar Bragg mirrors of a conventional, high Q semiconductor cavity. Such circular Bragg gratings do not form the initial resonant cavity, but rather, aid in controlling relatively low Q, transverse modes of an existing Fabry-Perot structure. In such cases, the resultant control of transverse propagation may allow lowered thresholds, or enhanced stability.

Earlier, large-scale, laser designs of a circular geometry operated on very different principles than the microlasers, utilizing primarily gas laser mediums and metallic reflectors. In these earlier designs, optical power could be coupled for useful work at the center of the cavity, such as for isotope separation, or by using a conical reflector. Since, in these latter cases, laser modes that concentrated energy at the cavity's center were needed, some means for blocking the whispering-type modes was generally required. Such mode suppression was usually accomplished through radial stops; however, these stops only provided the most rudimentary mode control, in addition to hampering the efficient operation of the laser. Because of such issues, disk and spherical lasers have not supplanted standard linear lasers for any applications requiring substantial optical power or a high degree of mode selection.

SUMMARY OF THE INVENTION

| | |
|---|---|
| p | number of high-index and low-index layer pairs in VHF-BR |
| $n_g$ | refractive index of gain volume |
| $n_h$ | refractive index of high-index layer in VHF-BR |
| $n_l$ | refractive index of low-index layer in VHF-BR |
| $\Delta n$ | difference in refractive index between $n_h$ and $n_l$ |
| $n_l/n_h$ | ratio in refractive index of $n_l$ to $n_h$ |
| r | radius of optical cavity (outside edge of the VHF-BR) |
| d | thickness of gain volume |
| K | average optical extinction of the VHF-BR |
| $\Delta\theta_r$ | degrees of solid cone of reflection in optical cavity |
| $\theta_o$ | central angle of highest reflectance in optical cavity |
| $\theta_n$ | angle-of-incidence of a non-preferred mode in optical cavity |
| $\lambda_c$ | wavelength of mode in optical cavity |
| $\lambda_p$ | wavelength of pumping source |
| $\omega_p$ | frequency of pumping oscillations |
| $\omega_c$ | frequency of cavity oscillations |
| N | number of pump sources |
| $\theta_s$ | radial angle between pump sources as referenced from cavity axis (9) |
| $\theta_p$ | phase angle between peak emissions from separate pump sources. |

DEFINITIONS

The term "surface-of-revolution", in the present disclosure will have the same meaning it does in mathematics, as a the three dimensional surface created by rotating a given profile around an axis, such as represented by cones, spheres, cylinders, etc. A "surface of revolution", in the present disclosure, will accordingly refer to surfaces of physical structures that form a surface of revolution.

In the detailed descriptions of the present disclosure, it shall be understood that the terms "VHF-based cavity" and "optical cavity" are used to indicate structures specifically pointed out to form such cavities.

The term "finesse" shall be understood to refer to its usage as a measure of an angular sensitivity obtained through a very large number of interfering waves, whether such waves are made colinear by diffraction or reflection.

Angle-of-incidence shall refer to the angle at which a paraxial ray of light is incident upon a surface, with orthogonal incidence being 0°.

A novel laser cavity is disclosed for use in such applications as lasers and light amplifiers in general. In its first preferred embodiment, the disclosed cavity comprises a cavity mirror structure that provides a single surface of revolution. The cavity volume is defined by this surface of revolution, and contains the gain medium. Unlike prior art disk and/or spherical lasers possessing circular cavities, the present invention does not rely on total internal reflection (TIR) or metallic reflectors to provide a high cavity Q-factor (and a broad range of high-order modes). The laser cavity design of the present invention avoids use of these cavity confinement methods. In the optical resonator of the present invention, interference-based multilayer dielectric (MLD) reflectors are constructed that can possess unusually narrow reflection peaks, corresponding to a degree of finesse (finesse designating interference-based resolving power) usually associated with MLD transmission filters of the Fabry-Perot type. The high-finesse MLD reflectors of the present invention conform to the surface of revolution of the cavity mirror structure, allowing a high degree of angle-dependence for selective containment of cavity modes. These filters are disposed in such a way as to allow preferred low order modes (lower order modes being represented in the present disclosure as those corresponding to near normal incidence radiation) and suppression of parasitic modes while allowing a high cavity Q factor for the modes selected.

For a multi-layer dielectric (MLD) coating consisting of alternating layers, where all layers have an optical thickness equal to a quarter-wave of light at the wavelength of interest, the reflectance may be described according to:

$$R = \left( \frac{1 - (n_H/n_L)^{2p}(n_H^2/n_s)}{1 + (n_H/n_L)^{2p}(n_H^2/n_s)} \right)^2 \quad (1.1)$$

wherein the index of refraction for the substrate is $n_s$, the two layer indices are $n_H$ (high index) and $n_L$ (low index), and the number of pairs of alternating layers is p. As is evidenced by equation (1), a higher reflectance may be achieved through the implementation of a greater difference in refractive index $\Delta n = |n_2 - n_1|$. Properties of quarter-wave MLD'S, such as represented by eqn (1.1), are well-explored in the prior art of thin film filters. More exhaustive explanations may be found in Angus MacLeod's book, *Thin Film Optical Filters*, $2^{nd}$ Ed., McGraw-Hill, 1989, pgs. 158-187, which is included herein by reference. High reflectance is thus normally achieved by maintaining $\Delta n$ at a relatively high value. However, as equation (1) suggests, high reflectance may also be achieved by depositing many layer pairs possessing a relatively low difference in their refractive indices. As the index difference decreases, many more pairs of alternating layers must be deposited to maintain reasonable reflectance. At the same time, this latter approach will result in a decrease in the bandwidth of light reflected by the resultant coating. The present invention utilizes MLD coatings which obtain high reflectance from an unusually low $\Delta n$; this is accomplished by maintaining a high degree of control over the properties of each layer through an unusually high number of iterations, p, of the layer pair. With well-controlled film characteristics, the reflectance of the resulting MLD coating may be fabricated to have a quite narrow bandwidth, typically in the order of nanometers.

Unlike the typically high $\Delta n$ of MLD-based Bragg reflectors used in semiconductor laser cavities of the prior art, the very high number p of low $\Delta n$ layer pairs provides for unique means of obtaining mode selection in cavities of the present invention, due to the high sensitivity of reflectivity to angle-of-incidence. Accordingly, the MLD-based Bragg reflectors of the present invention will be herein termed Very-High Finesse (VHF) Bragg reflectors, henceforth referred to as VHF-BR's, for purposes of teaching the novel embodiments disclosed herein. The multi-layer dielectric VHF-BRs described herein are, of course, physically and operationally distinct from grating structures that have also been called "Bragg reflectors" and provide an associated high finesse, but operate by diffraction. The disclosed VHF-BR is also dictinct from multilayer Bragg reflectors incorporating much larger $\Delta n$ and smaller p, so that sensitivity to angle-of-incidence is not adequate for providing useful mode-selection properties in the optical cavities contemplated herein. The disclosed VHF-BR-based cavities disclosed will also be found distinct from the multilayer Bragg reflectors and cavities utilized in "Bragg fiber gratings" that utilize high-index cavities for wave-guiding and in which divergence of a propagating beam is determined by the fiber structure.

A characteristic of the VHF-BR utilized in the present invention is the angle-dependence of the reflection peak. As the VHF-BR is irradiated at increasingly oblique angles of incidence, the spectrally narrow reflection peak will be shifted toward increasingly shorter wavelengths. While the degree of this latter peak shift will depend on such issues as phase dispersion and the change in optical admittance with increasingly oblique incidence, the fractional shift in the peak transmittance will change generally with the phase thickness shift. As such, the fractional shift in peak transmittance will be slightly less than $\cos \theta$, where $\theta$ is the angle from normal incidence. As the angle of incidence, $\theta$, increases, the magnitude of the reflectance peak will generally decrease, as well. This decrease in magnitude will be made greater by the formation of the VHF-BR as a circular reflector, so that non-normal incident propagation suffers from a lack of coherence in its reflection from the curving layers of the reflector.

The aforementioned characteristics of these VHF-BR's are utilized in the preferred embodiments of the present invention. In accordance with the illustrated preferred embodiments, a novel laser cavity structure is disclosed herein that effectively utilizes the sensitivity of the aforementioned coatings to angle-of-incidence when these same coatings are irradiated with quasi-monochromatic light. This is normally accomplished through the use of a cavity mirror that conforms to a single surface of revolution. High confinement is achieved through novel use of the highly angle-dependent VHF-BR's. Thus, instead of utilizing TIR or metal films, which both provide wide acceptance angles to high order cavity modes, the present invention utilizes external reflection and narrow acceptance angles to increase the stability of selected, lower order, cavity modes.

Because the present invention does not rely on TIR or metallic films to provide high confinement for various laser modes, it is designed with a fundamentally different set of requirements for the refractive indices of its individual components. In contrast to the disk and spherical lasers of the prior art, the gain medium—or, equivalently, the volume in which it resides—in lasers of the present invention should preferably possess an effective refractive index, $n_g$, lower than that of the immediately surrounding medium. As such, the high index layers of the VHF-BR of the present invention must have a refractive index, $n_H$, greater than that of the gain volume.

In one preferred embodiment, the present invention is particularly suited to operation with excimer gases as the gain medium, due to the mode-selection means providing substantially improved cavity quality for the preferred modes, while allowing very little cavity confinement for unwanted cavity modes, so that conventional unstable resonators common to excimer laser design are no longer required to provide useful mode discrimination.

In another embodiment, the invention provides a unique configuration for coupling laser radiation from the center of a solid state laser cavity. The latter embodiment includes a solid state gain medium that is formed into an annular disk geometry having diameter larger than its thickness, so that efficient cooling of the medium may be performed through cooling of first and second opposing faces of the medium. The disclosed solid state gain medium further includes a first surface-of-revolution comprising its outer edge, whereon a VHF-BR is formed for cavity confinement of optical energy. The disclosed solid state gain medium also has a second surface-of-revolution comprising the inner edge of the annular disk, which provides a means for out coupling optical energy from the annular disk. Specific means for outcoupling optical energy from the annular solid state gain medium include a disclosed combination of a concentric conical reflector and beam condensation means.

In yet another embodiment, the invention provides mode selection means in solid state gain media that are polygonal in shape; for example, rectangular, pentagonal, trapezoidal, etc. Improved amplification and lasing characteristics are provided in such polygonal gain media through implementation of a VHF-BR reflector on one or more planar facets of the gain medium. This embodiment particularly includes a rectangular "slab" geometry that provides for an improved spatial uniformity in absorption and gain, thereby decreasing mechanical stress and thermal lensing effects. The disclosed slab geometry is incorporated in both amplification modules and in a slab laser design. The embodiment provides improved thermal characteristics over previous slab laser designs, and uniform pumping and absorption within the gain material may be achieved without use of "zig-zag" or other folded-cavity beam paths.

In yet another embodiment of the present invention, low loss and very high finesse are achieved in the VHF-BR through use of interleaved layers of polymer thin films as the low-index layer, the high-index layer, or both. This disclosed polymer-based VHF-BR I preferably composed of polymer high-index layers and inorganic (such as silica) low-index layers. In the polymer-based VHF-BR, a very large number of layers (>1,000) may be deposited without the surface roughening, loss of specularity, and optical absorption that is a common problem when depositing thick all-inorganic VHF-BR's.

In an alternative embodiment, a deformable cavity material is disclosed providing novel mode-selection properties, the material providing a flexibility allowing it to conform to a variety of cavity shapes. Also, it is seen as particularly advantageous that the flexible cavity material can be fabricated with a tailorable elasticity that allows the reflective properties to be tuned via an applied tensile strain.

In another embodiment, the invention provides a means for incorporating the VHF-BR and associated optical cavities into a dielectric layer that is formed on a planar substrate. In this embodiment, a VHF-BR is formed through modification of the dielectric layer to form therein a concentric pattern of many ring-shaped regions possessing an index-of-refraction that is slightly higher than that of the original dielectric layer, thereby forming a VHF-BR structure enclosing an unmodified central region of the dielectric layer, so that an optical cavity is formed by the VHF-BR and the central region. In yet another embodiment, the planar substrate is preferably a polished wafer, preferably made of single-crystalline silicon (e.g., Czochralski or Bridgeman grown), and the dielectic layer is capped with a silicon layer, resulting in a novel silicon-on-insulator (SOI) substrate that incorporates an optical cavity within an insulator layer of the SOI substrate. In these embodiments that incorporate a modified dielectric layer, a gain volume is alternatively formed within the central region of the disclosed optical cavity by such methods as diffusing a dopant ion into the central region of the dielectric layer.

In another embodiment, a multitude of pump sources are positioned over the gain volume of the optical cavity, in a preferably symmetric pattern, so that the multitude of pumps may be powered with a cyclical power signal. The frequency of the cyclical power, as well as the shape of the pattern, result in a method and structure for preferentially producing gain in a desired mode of oscillation in the optical cavity.

Other objects of the present invention follow.

One objective of the present invention is to provide a laser cavity structure that allows high thermal stability.

Another objective of the present invention is to provide a disk or spherical laser cavity structure that discourages the establishment of whispering modes Another object of the present invention is to provide a laser cavity structure which allows mode selection through the use of all-dielectric reflectors of unusually high finesse.

Yet another object of the present invention is to increase the stability of conventional laser cavity structures through the suppression of walk-off modes.

Another object of the present invention is to provide a laser cavity structure that allows a low threshold to lasing.

Another object of the present invention is to provide a means for irradiating a photo-absorbing medium from a continuous 360-degree periphery.

Another object of the present invention is to provide a laser cavity structure that allows efficient and reliable mechanical design.

Another object of the invention is to provide a laser cavity structure that may be readily implemented for large-scale cavities.

Another object of the invention is to provide a laser cavity structure wherein the absorption edge of an incorporated material prevents unwanted laser modes.

Another object of the invention is to provide a laser cavity structure with an unusually high effective numerical aperture.

Another object of the invention is to provide an excimer-based laser cavity that provides inherently better cavity confinement of preferred modes relative to unstable resonators of previous excimer lasers.

Another object of the invention is to provide an excimer laser that utilizes a circular electrode configuration for high operational stability.

Another object of the invention is to provide an excimer laser that enables the use of cone elements for extracting energy.

Another object of the invention is to provide an excimer laser cavity wherein an absorption edge of an incorporated material limits unwanted lasing.

Another object of the invention is to provide an excimer laser that enables irradiation of circularly symmetric articles.

Another object of the invention is to provide an excimer laser that enables irradiation of dispersed media.

Allows for an excimer laser to be operated with excellent mode selection, without the use of the unstable resonators used in the prior art.

allows for electron discharge pumping to be implemented in a more stable, higher symmetry configuration.

Another object of the invention is to provide an excimer laser that utilizes a circular electrode configuration for high operational stability.

Another object of the invention is to provide an excimer laser that enables the use of cone elements for extracting energy.

Another object of the invention is to provide an excimer laser cavity wherein an absortion edge of an incorporated material limits unwanted lasing.

Another object of the invention is to provide an excimer laser that enables irradiation of circularly symmetric articles.

Another object of the invention is to provide an excimer laser that enables irradiation of dispersed media.

Another object of the invention is to provide a solid state laser device that allows efficient pumping of a very thin gain volume.

Another object of the invention is to provide a solid state laser cavity that is self-aligning.

Another object of the invention is to provide a solid state laser device that is monolithic.

Another object of the invention is to provide a thin-disk laser cavity that may be uniformly cooled on both faces.

Another object of the invention is to provide a thin-disk laser cavity that may be uniformly pumped on both faces.

Another object of the invention is to provide an edge-emitting solid state slab cavity that may be face-pumped.

Another object of the invention is to provide a solid state slab cavity that may be edge-pumped.

Another object of the invention is to provide a solid state slab cavity that deters self-lensing effects.

Another object of the invention is to provide a solid state slab laser that can be operated with less thermal gradient in the gain material.

Another object of the invention is to provide a solid state slab laser that can be operated with a lower thermal gradient.

Another object of the invention is to provide a laser cavity mirror with a high laser damage threshold.

Another object of the invention is to provide a laser cavity mirror that incorporates advantages of both organic and inorganic materials.

Another object of the present invention is to provide a laser cavity mirror with low optical absorption Another object of the invention is to provide a laser cavity structure that is inexpensive to fabricate Another object of the invention is to provide a laser device that provides a substantially spherical wavefront for irradiation of spherical workpieces.

Another object of the invention is to provide a laser device that provides

Another object of the invention is to provide a solid state laser device that allows efficient pumping of a very thin gain volume.

Another object of the invention is to provide a solid state laser device that is self-aligning.

Another object of the invention is to provide a solid state laser device that is monolithic.

Another object of the invention is to provide a laser cavity that is contained within a silicon-on-insulator (SOI) substrate.

Another object of the invention is to provide an optically pumped laser cavity that can be fabricated with integral electronic devices.

Another object of the invention is to provide a laser device that is easily integrated with silicon-on-insulator (SOI) devices.

Another object of the invention is to provide a means for mode selection in a laser cavity that utilizes oscillating pump sources.

Another object of the invention is to provide an all-optical switching means that utilizes walking cavity modes.

Other objects, advantages and novel features of the invention will become apparent from the following description thereof.

BRIEF DESCRIPTION OF DRAWINGS

FIG. 8 is a sectional side view of an excimer laser apparatus utilizing a VHF-BR-based cavity that is conically-coupled, wherein the cross-section is taken along the plane formed by axes (9) and (149).

FIG. 18 is a sectional side view of an solid state laser apparatus utilizing a VHF-BR-based cavity that is cylindrically-coupled, wherein the cross-section is taken along the plane formed by axes (9) and (149).

DESCRIPTION OF THE PREFERRED EMBODIMENTS

The following description and FIGS. 1-36 of the drawings depict various embodiments of the present invention. The embodiments set forth herein are provided to convey the scope of the invention to those skilled in the art. While the invention will be described in conjunction with the preferred embodiments, various alternative embodiments to the structures and methods illustrated herein may be employed without departing from the principles of the invention described herein. Like numerals are used for like and corresponding parts of the various drawings.

Figure 1:
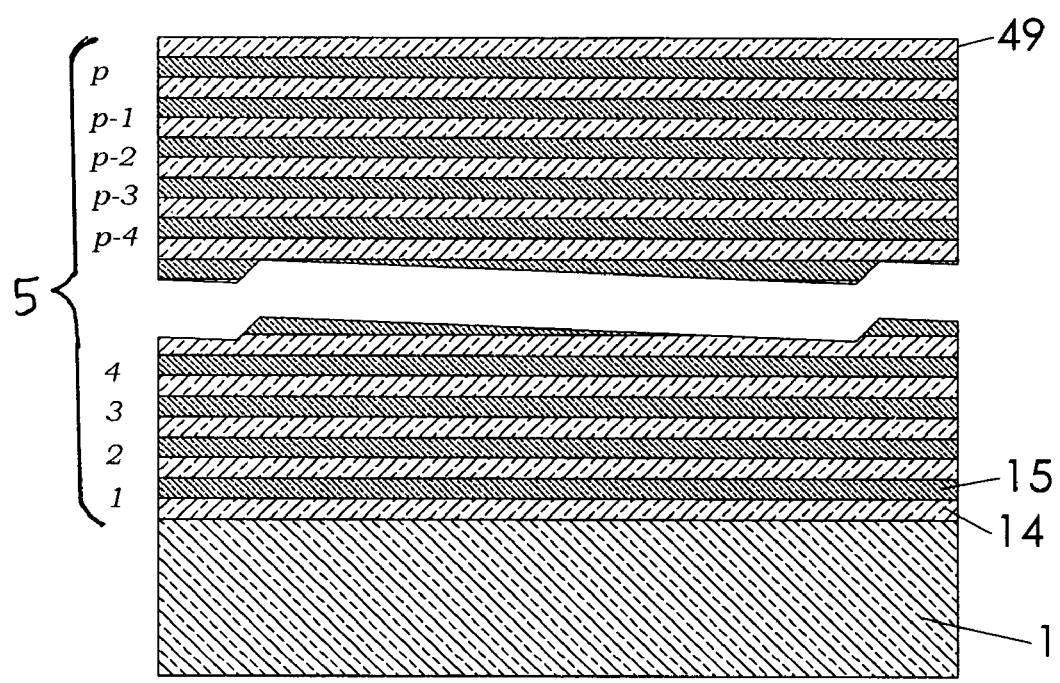
FIG. 1 is a delimited cross-sectional view of a thin film design for a VHF-BR used in the preferred embodiment.

In FIG. 1 is a repeated scheme for the build-up of a high-reflectance VHF-BR (5). The VHF-BR contains p quarter-wave pairs, each consisting of a low index layer (14) and a high index layer (15). The substrate (1) provides the surface of revolution onto which the VHF-BR is deposited. Each pair of quarter-wave layers (14) and (15) share a small refractive index difference, Δn, which is typically less than 0.1. The number of quarter-wave pairs, p, will typically be greater than 50 to maintain high reflectance. The quarter-wave pairs may be deposited sequentially to achieve VHF-BR's containing hundreds of layers. Materials optimally used will depend upon the spectral region desired for lasing action. In many cases the small difference in real refractive index, Δn, may be achieved by making substitutions into the matrix of a parent material.

The precise choice of materials for the high-index and low-index layers will depend upon the specific optical cavity under consideration. The indices of the VHF-BR are preferably matched to the index of the gain volume $n_g$, which is also the $n_s$ of equation (1.1) so that the index of the high-index layer, $n_h$, is only slightly higher than that of the gain volume. For example, if the gain volume is fabricated from a silicon dioxide material with a nominal index of 1.46, the high-ndex layer would preferably comprise a material slightly higher in index, for example $n_h$=1.48. In this particular embodiment, an index of around 1.48 may be achieved in a modified or doped silicon dioxide material, or with various polymer materials, such as polymethyl methacrylate (PMMA), Perspex, or polyvinyl acetate. For this particular index ratio of $n_l/n_h$=0.9865, it is preferable that p is greater than 200, so that a reflectivity of approximately 99% is achieved. Of course, certain cavity designs may suitably incorporate a VHF-BR having less than 99% reflectivity, without departing from the principles and structures disclosed herein.

Of course, in accordance with the known properties of a VHF-BR, a smaller difference between $n_h$ and $n_l$ will result in a smaller reflectance and a greater sensitivity to angle-of-incidence (or finesse) for a given $n_g$. It is therefore preferred, to achieve both very high finesse and adequate reflectivity, that both the ratio $n_l/n_h$ be as close to 1 as practicable, and that the number of layer pairs, p, be sufficiently large to provide adequate reflectivity for the particular selection of $n_l/n_h$ being implemented.

The range of values that the above variables can have for realizing the benefits of a VHF-BR-based cavity will vary considerably, based upon the particular optical resonator contemplated. For the purposes of the present disclosure and resonator designs contemplated herein, a VHF-BR should have an index ratio in the range, $1>n_l/n_h>0.95$, and $p \geq 50$. Preferably, the index ratio is in the range, $1>n_l/n_h>0.97$, and $p \geq 100$, and, ideally, an index ratio in the range, $1>n_l/n_h>0.98$, and $p \geq 400$. The various combinations of $n_h$ and $n_l$ p $n_g$ that may be succesfully used to provide effective mode-selection in an optical resonator will be determined by the particular device under consideration.

For instance, $ZrO_2$ may be deposited as the parent material by ion beam sputtering, thereby forming one of the quarter-wave layers. Subsequently, the second layer material may then be formed using the same process, while co-sputtering a second material, such as $TiO_2$, $CeO_2$, $HfO_2$, or $NbO_2$, from a separate target in the same process chamber, resulting in the second layer being a mixture of the two oxides. As a result, the refractive index of the second layer may be controllably rendered slightly higher than that of the first layer; this, through the well-controlled addition of the second material to a $ZrO_2$ matrix.

The VHF-BR, as shown in FIG. 1, may also be constructed with additional thin film structures incorporated for performing additional functions, such as anti-reflection coatings or secondary reflectors, and so forth. However, to achieve the finesse required in the present invention, the VHF-BR design chosen for the cavity mirror must incorporate a high number of quarter-wave pair iterations, accompanied by an unusually small index difference, $\Delta n$.

Figure 2:
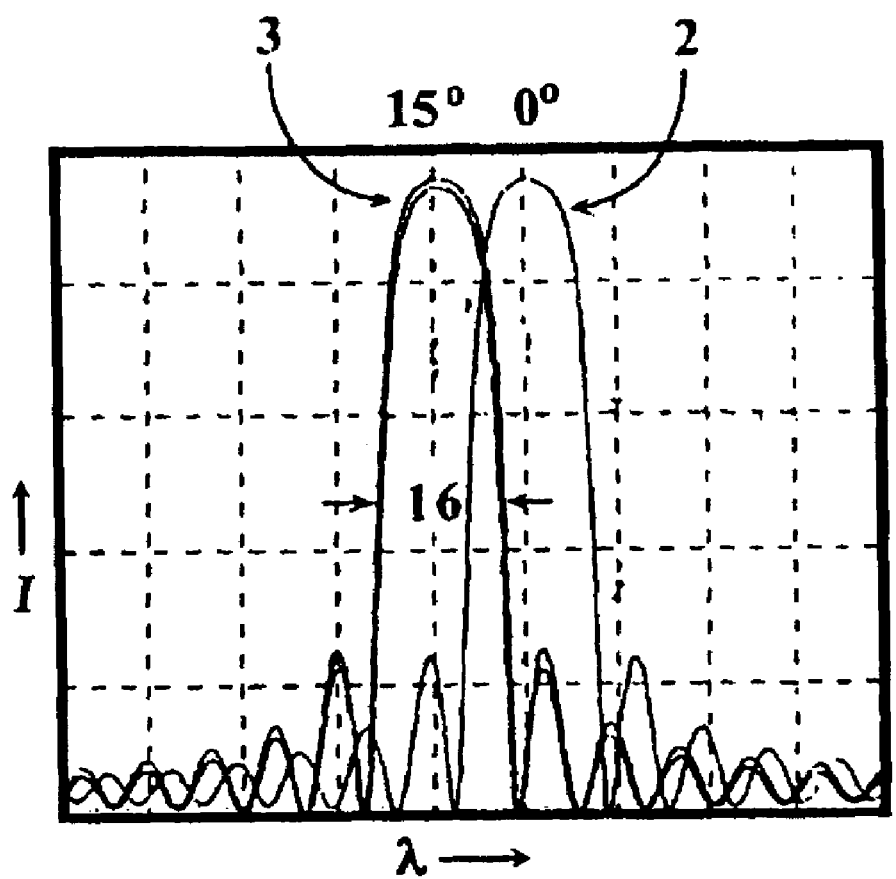
FIG. 2 is a reflectance characteristic for an VHF-BR coating fabricated in accordance with the embodiments set forth in FIG. 1, showing normal incidence and tilted reflectance.

In FIG. 2 are reflectance curves, in wavelength $\lambda$ vs. % reflectance, for an VHF-BR fabricated according to the embodiments in FIG. 1, for light incident approximately normal to the substrate, wherein the VHF-BR is fabricated to provide highest reflectance at an angle $\theta_o=0°$, which is herein equivalent to normal incidence, orthogonal to the VHF-BR surface. The reflectance peak of the VHF-BR at normal incidence, as given by the solid line (2), is an example of the narrow full-width-half-max (FWHM) achieved with low $\Delta n$. The reflectance peaks of FIG. 2 is obtained from a VHF-BR containing ninety pairs (p=90) of the quarter-wave layers, with the index difference of the pair, $\Delta n=0.04$. A topmost high-index layer (49) would typically be deposited to give maximum reflectance, resulting in an odd number of layers (in this case, 181 layers). The dashed line (3) in FIG. 2 is the reflectance peak for the same VHF-BR when irradiated with light at an angle of 15° from normal incidence. The spectral shift between the two reflectance peaks of FIG. 2 is found to be approximately $\lambda_o-\lambda_1=\Delta\lambda=5$ nm, while the magnitude of p-polarization peak reflectance is also found to drop from 95% to 94%. The magnitude of the peak reflectance may be increased through an increase in p; and, as peak reflectance increases, the latter 1% percent drop becomes an increasingly decisive factor in determining cavity Q, and mode selection, within a laser cavity constructed in accordance with the preferred embodiments. The characteristic of FIG. 2 is only for demonstration, as much narrower reflection peaks may be obtained.

A more narrow, or broad, FWHM (16) may be obtained by varying $\Delta n$ according to the previously described relationships. In addition to the narrow FWHM, another useful characteristic of this VHF-BR, when incorporated in the present invention, is the pointed shape of the peak, as this pointed shape allows a more narrowly defined peak reflectance. The utility of these characteristics will become apparent when discussed in conjunction with the embodiments of FIGS. 3-36.

It is not intended that the VHF-BR be restricted to the embodiments of FIG. 1-2, as the latter embodiments are presented primarily for the purpose of teaching the invention.

The VHF-BR implemented in a particular embodiment will depend on its particular requirements. The VHF-BR may comprise organic or inorganic materials, or a combination of both. The design of the VHF-BR may vary considerably, as well. For instance, certain layer pairs within the VHF-BR may possess a much higher $\Delta n$ without appreciably increasing the FWHM of FIG. 2. The thin film materials utilized may possess amorphous or crystalline microstructures; and as such, may be optically isotropic, uniaxial or biaxial, depending upon the precise transmission characteristics desired of the VHF-BR. The VHF-BR may, in some applications, be designed for peak reflectance at a relatively large angle of incidence. Various other functions may also be incorporated into the VHF-BR coating design, such as an anti-reflection coating, or the transmission of a particular fluorescence peak.

Figure 3:
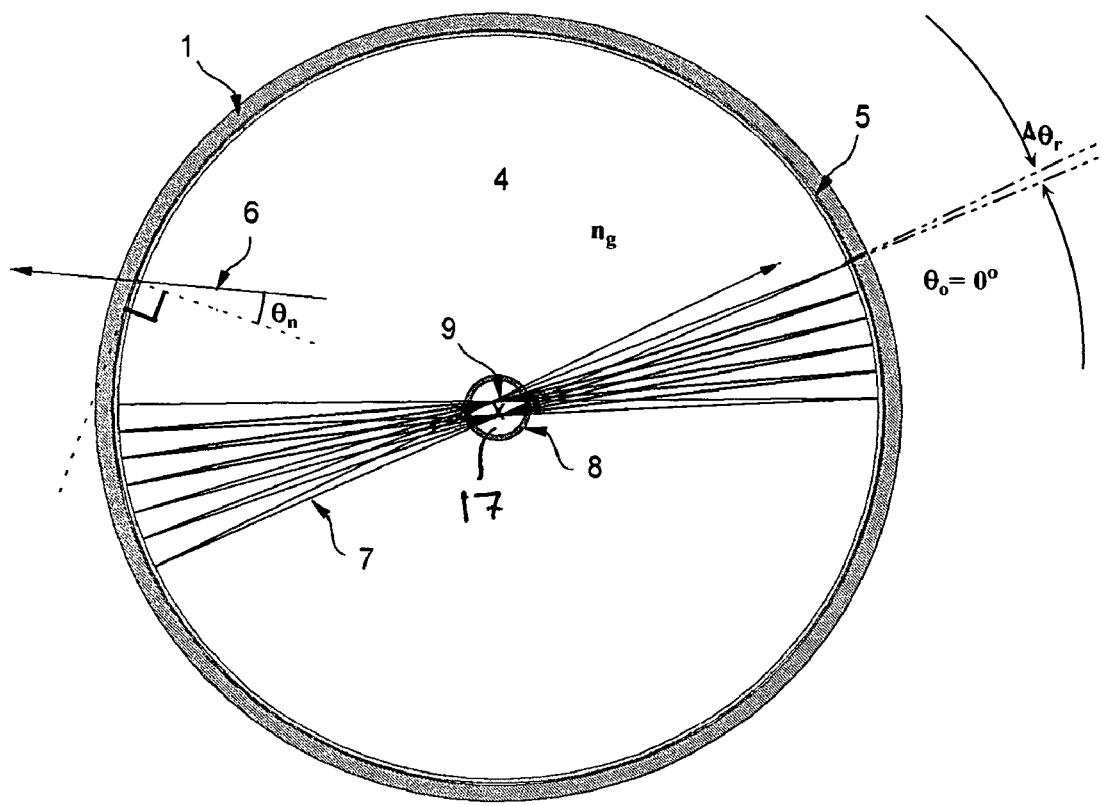
FIG. 3 is a sectional top view of the disclosed optical cavity in its first preferred embodiment.

In FIG. 3, the present invention is shown in its first preferred embodiment. The substrate (1) provides the structure by which the surface of revolution, with axis of circular symmetry (9), is defined. In the embodiments of FIGS. 3-20, this surface of revolution will be identical to the interface between the substrate (1) and the VHF-BR (5). The VHF-BR (5), as described in FIGS. 1-2, conforms to this surface of revolution and modifies its reflective characteristics. The gain medium for the laser is contained within the cavity interior (4), formed by the substrate and integral VHF-BR. As such, if a fluorescent event occurs within the gain medium, its confinement within the cavity is very much altered through the incorporation of the previously set forth VHF-BR. The VHF-BR limits the bandwidth of the laser emission, first through the interference filtering of the normal incidence emission, as practiced in the prior art. However the circular geometry of the present invention, combined with the high angle-dependence of the VHF-BR, as described in FIGS. 1-2, requires that emission from the fluorescent event also propagate within a narrowly defined solid angle, $\Delta\theta_r$, if it is to be reflected back into the cavity interior (4). Propagation which occurs outside this solid angle, such as indicated by solid line (6), will be allowed to transmit outside of the cavity interior (4), thereby avoiding the establishment of laser modes for such off-angle propagation. In the geometries described, these highly angle-dependent VHF-BR's thereby become a means of mode selection. The zig-zag line (7) which depicts the direction of mode propagation is only for demonstration, but indicates that the concentration of allowed modes is at or near normal incidence. The precise angle of the dominant mode will be determined by such design considerations as the preferred angle-of-incidence, the fluorescence spectra of the gain medium, the type of coupling desired, etc.

In the laser cavity structure of the present invention, confinement of the laser modes to paths that are at or near to normal incidence allows several unique coupling configurations. One such configuration is shown in FIG. 3, wherein laser radiation is coupled from the laser by introducing the media to be processed into the center of the laser cavity. This may be accomplished through implementation of a tube (8), which separates the gain medium from the process media passing through the tube interior, thereby providing a process volume within the cavity. The latter embodiment will be particularly effective in the processing of media that possess low absorption cross-sections, such as gases and vapors. Alternatively, the central coupling structure designated by the tube (8) may instead contain a cone-shaped optical element for extraction of laser light from the center of the cavity as has been described in numerous papers and patents of the prior art.

Figure 4:
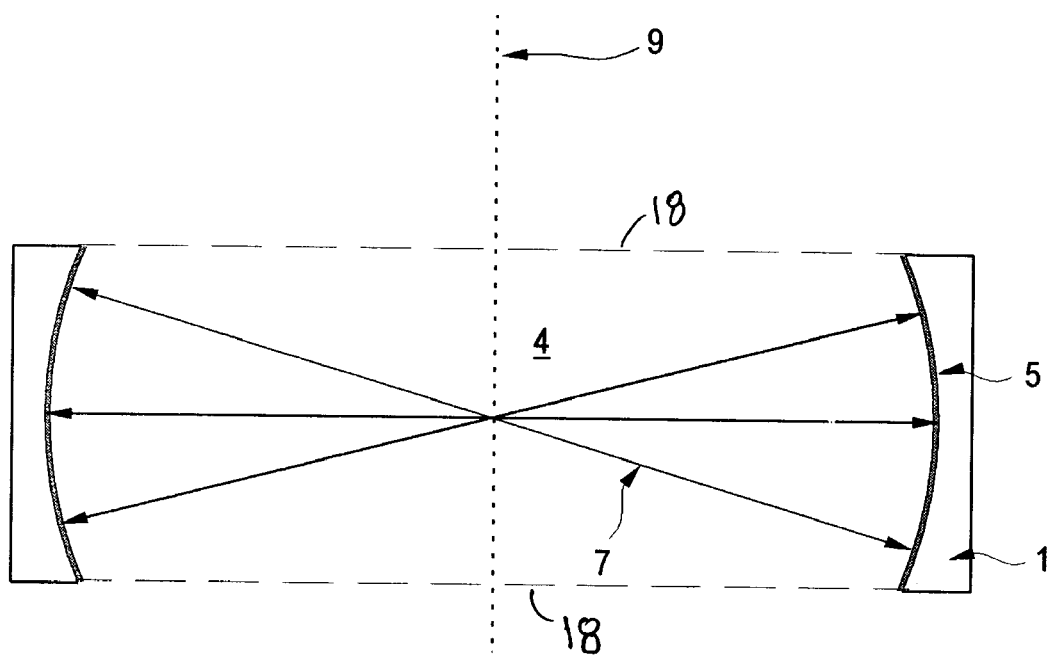
FIG. 4 is a sectional side view of the invention embodied as a spherical cavity.

The cross-sectional figure of the cavity mirror may be designed variously, dependent upon the type of gain medium and lasing action required. In FIG. 4, the surface of revolution possesses a cross-sectional figure with a radius of curvature equivalent to that of the surface of revolution as viewed from the top in FIG. 3, thereby rendering it a spherical section. In this embodiment, laser emission is confined to propagate through a volume (17) located at the center of the spherical mirror, intersected by the axis of circular symmetry (9), thereby allowing an unusually high power density within this small volume.

It should also be noted that the embodiments of FIGS. 3-4 do not require that the described spherical cavity laser be restricted to any particular major spherical section. In fact, the cavity structure sectional view of FIG. 4 may as easily describe operation of a cavity structure that is not truncated at all, so that the cavity is a complete sphere. Also, the VHF-BR described herein may, in many circumstances, be deposited on the external surface of the substrate, therein defining the surface of revolution. In these latter circumstances, the substrate would reside within the cavity interior, and hence would need to be quite transparent to the desired wavelengths. Such a case might be when the required surface of revolution is the external surface of a sphere, which may be composed of a laser glass or crystalline material.

Figure 5:
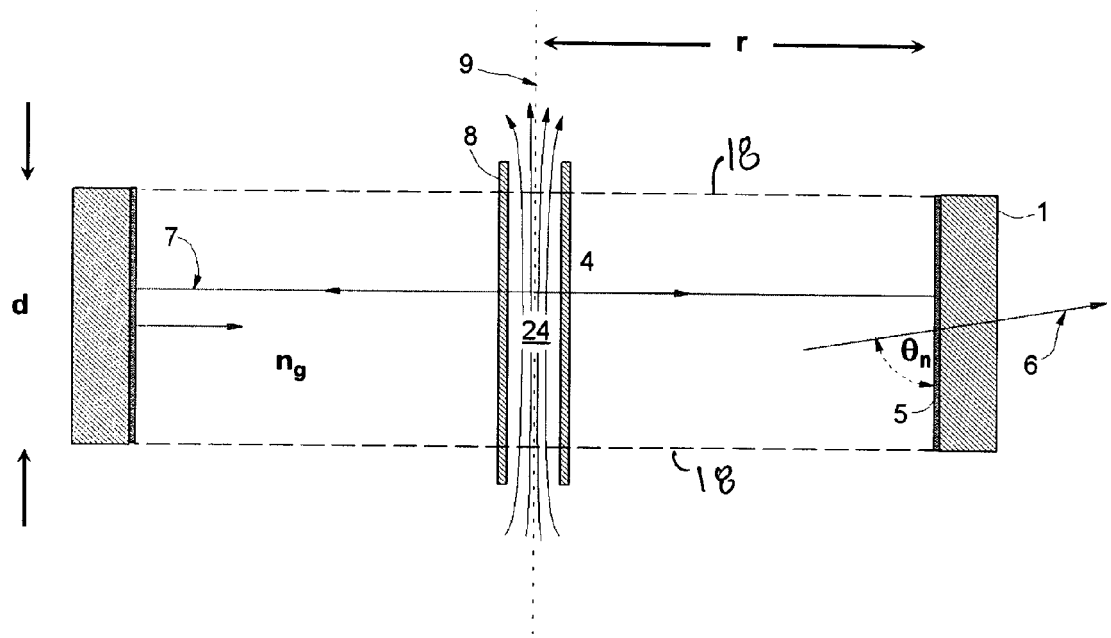
FIG. 5 is a sectional side view of the invention embodied as a cylindrical cavity.

Another embodiment of the present invention is presented in FIG. 5, in which the cross-sectional figure of the surface of revolution—again, identical to the VHF-BR/substrate interface—is straight, thereby rendering the surface of revolution a cylinder. The cylindrical shape of the laser cavity structure in the latter embodiment serves to demonstrate an added utility that is realized with the incorporation of the described VHF-BR's. Unlike the cavity geometries of the prior art, linear and other, which use relatively low-finesse reflectors, the present invention allows the stability associated with a particular cavity mirror selection to be increased. Whereas flat (or cylindrical) cavity mirrors will typically support parasitic "walk-off" modes which can decrease the overall Q-factor of the laser cavity, these same modes, such as exemplified by propagation direction (6) in FIG. 5, will be discouraged due to the low reflectivity of the cavity mirrors at these angles.

The laser cavities described in the present invention may comprise gas, solid, or liquid gain media, and may be pumped by any of the compatible methods described in the art. Also, the present invention allows for a unique method of optical pumping.

It should be noted that, in embodiments of the present invention where the laser cavity is fabricated with a disk-like aspect, thermal stability is typically more easily obtained than in other laser cavities. This latter advantage is due to the ability to effectively heat-sink the cavity through its planar sides—as indicated by dashed lines (18) in FIGS. 4-5—as these surfaces need not be transparent. In fact, these surfaces can possess any of a number of reflecting, absorbing, or scattering characteristics, depending on the application. The ability to heat-sink these cavities can be particularly important in the case that the gain medium is solid state. Heat-sinking, in such a case, may also be performed effectively through the cavity mirror, as long as the outer layers of the cavity mirror are specified so as to prevent any possible TIR of unwanted laser wavelengths. If the laser cavity structure of the present invention is to be operated in an ambient medium which possesses a refractive index, $n_A$, substantially lower than $n_G$, then an absorbing and/or scattering layer is preferably utilized externally to the VHF-BR. This latter use of an absorbing and/or scattering layer serves to prevent specular reflection of unwanted cavity emissions back through the VHF-BR to re-enter the gain volume. Such measures could be implemented in the case that the gain medium is solid state.

Figure 6:
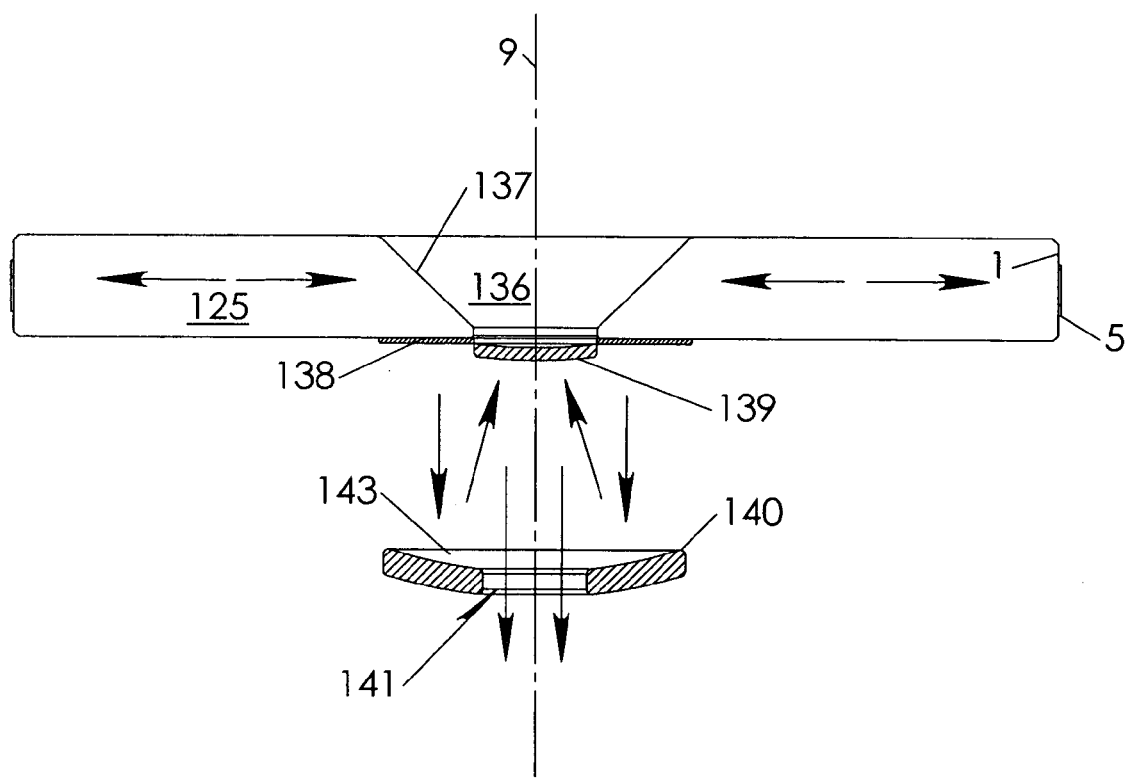
FIG. 6 is a sectional side-view a disclosed cylindrical laser that is centrally-coupled.
Figure 7:
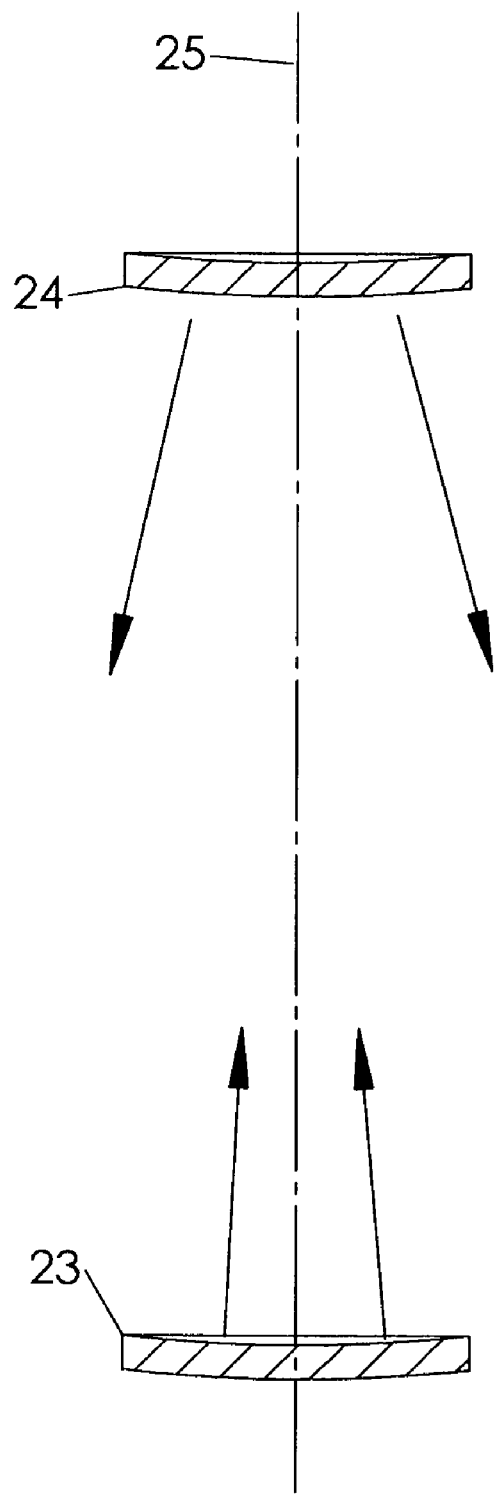
FIG. 7 is a sectional view of a prior art unstable resonator common to excimer laser designs.

In the case that optical radiation is to be coupled from the center of a circular VHF-BR-based cavity that utilizes a cylindrical surface of revolution as the surface on which the VHF-BR is formed, such extraction may be performed through use of a conical reflector, in FIG. 6. The conical reflector is preferably a metallic reflecting surface (137), such as an aluminum film, that is formed on the conical surface of the conical reflector structure (136), which is preferably formed from an easily heat-sinked material, such as copper, aluminum, silicon carbide, etc. In the embodiments of FIG. 6, the conical reflector is an inter-cavity mirror that folds propagating light toward an outcoupler mirror (138), which is a semi-reflecting planar mirror possessing an annular clear aperture sufficient for outcoupling the incident annular beam reflecting from the conical reflector. Further embodied is the implementation of beam condensing means that comprise a nominally telescopic optical assembly. The beam condensing means of the present invention includes a primary reflector element (140) and a secondary reflector element (139), so that light coupled from the outcoupler mirror is incident onto the reflective surface of the primary element, the light reflected by the primary element to be incident onto the secondary element, the light reflected by the secondary element to exit the central aperture (141) of the primary element, thereby providing an optical beam that propagates along central axis (9). The optical assembly comprising the primary and secondary element may be specified variously, but is preferably an afocal Cassegrainian design, wherein the primary surface is a paraboloidal-concave surface, the secondary element provides a hyberboloidal-convex reflecting surface, and the two reflective elements are positioned to provide a parallel beam that exits the central aperture. Such designs are known in the prior art, and are discussed in *Astronomical Optics*, by Daniel J. Schroeder, $2^{nd}$ Ed., Academic Press, e.g., pg. 200, included herein by reference. It may be readily seen that other nominally telescopic designs may be alternatively used to provide either parallel or focussed exit beams, such as other Cassegrainian, Newtonian, or Gregorian optical assemblies specifically designed for focussing or condensing parallel light beams.

The VHF-BR-based cavity structure of FIG. 6 is particularly advantageous when utilized in conjunction with excimer-based gain media, due to the "built in" nature of the population inversion in excimers. The absence of a ground state in excimer gain media results in the propensity for many modes to readily experience gain in conventional stable resonators, so that various unstable resonators are utilized to limit the number of resonator modes that may experience high confinement by the unstable resonator mirrors. Such unstable resonators, in FIG. 7, generally utilize at least one convex mirror (24) that is incorporated in a linear resonator opposite the outcoupler mirror (23), so that a relatively limited number of modes are present in the resulting laser beam propagating along the optical axis (25). Such unstable resonators are thus an inefficient means of providing laser energy, since the mode-discrimination means requires continual loss of energy to walk-off modes. Thus, the VHF-BR-based cavity structure provides an attractive alternative to such unstable resonator designs, since the VHF-BR provides for high confinement of normal-incidence propagation across an extended aperture, namely, within the plane of oscillation in FIG. 3, when the VHF-BR is designed to provide maximum reflectance for the peak emission wavelength at normal incidence. At the same time, the circular VHF-BR-based cavity design provides sharply decreasing confinement for modes that rely on non-normal incidence, so that the off-axis modes that have very low cavity Q in the prior art unstable resonator of FIG. 7 will similarly have a low cavity Q in the circular VHF-BR-based cavity, whereas the desired normal and near-normal incidence radiation will be highly confined across the extended aperture of the VHF-BR surface. As disclosed earlier, the VHF-BR may also include materials having an absorption edge to further decrease reflection of unwanted shorter wavelengths that may otherwise be reflected at non-normal incidence.

An excimer-based laser apparatus that incorporates the advantages of a circular VHF-BR-based cavity is accordingly disclosed herein. In the present disclosure, laser apparatus that rely upon excimer transitions for a characteristic emission will be termed as excimer-based lasers, whereas the various gases utilized for providing gain in excimer-based lasers will be referred to as excimer-based gain gases or media.

TABLE 3

Excimer transitions of selected gases

| $Kr_2$ | $Xe_2$ | ArF (B-X) | KrCl (B-X) | XeCl (B-X) |
|---|---|---|---|---|
| 146 nm | 172 nm | 193 nm | 222 nm | 308 nm |

The preferred embodiments of such an excimer laser apparatus provide for an annular gain volume (125), that is concentric to a circular reflector comprising a substrate (1) providing the surface-of-revolution and VHF-BR (5) formed thereon, in FIGS. 8-13. In accordance with the embodiments of FIG. 6, the present excimer laser also incorporates a conical reflector structure (136) providing a conical reflector surface (137). The various components of this excimer laser apparatus are preferably positioned and sealed between first annular flange (144) and second annular flange (145). The flanges incorporate a circular array of gas inlets (154) and a circular array of gas outlets (155) that are concentric to the circular cavity.

Prior art excimer-based lasers typically utilize opposing linear electrode configurations for providing electron discharges or other forms of discharges for exciting the excimer-based medium that is passed between the linear electrodes. The disclosed VHF-BR-based excimer instead utilizes opposing first annular electrode (151) and second annular electrode (152), so that the gain volume (125) residing between the two annular electrodes is accordingly annular as well. An annular electrode insulator (150) provides insulation between the electrodes an flange housing.

The embodiments of FIGS. 8-13 are particularly advantageous for reasons other than the mode discrimination provided by the circular VHF-BR-based cavity. The circular geometry of the annular electrodes and adjoining annular discharge region (roughly, the gain volume) provide for inherently higher operational stability than is provided by conventional linear electrodes. This higher stability is owed to the absence of "end-effects" that are intrinsic to any linear discharge, wherein properties of the discharge—such as the electrical field, conductivity of the discharge gas, electron-density, gas composition, etc.—are different in the vicinity of the linear electrode's either end then alon the electrodes middle region. This inhomogeneity begets local changes in the surface chemistry and electrical properties of the electrode and nearby surfaces, so that degradation of homogenous properties in the linear electrode discharge must result. Such problems are by-passed in the presently disclosed excimer laser, since no such asymmetry or end-effects exist in discharges sustained between the annular electrodes. The high symmetry of discharges supported by the annular electrodes is further improved by the radially symmetric gas inlets and gas outlets, which allow for a radially symmetric gas flow and pressure gradient to exist across the annular electrodes. All components of FIG. 8 are radially symmetric about the central axis of symmetry (9), except for the electrode power leads (153).

Figure 9A:
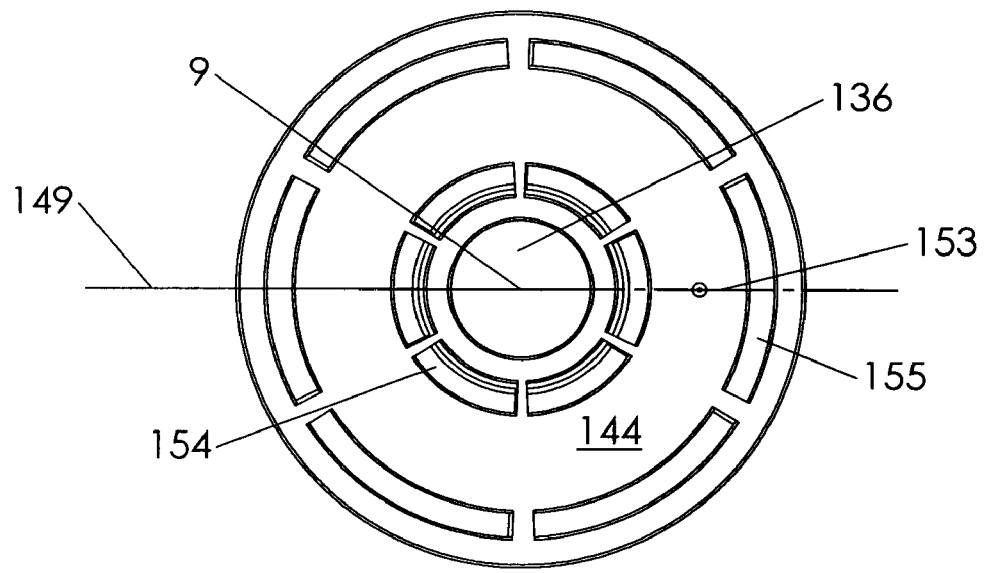
FIG. 9a is a top view of the excimer laser apparatus utilizing a VHF-BR-based cavity that is conically-coupled.
Figure 9B:
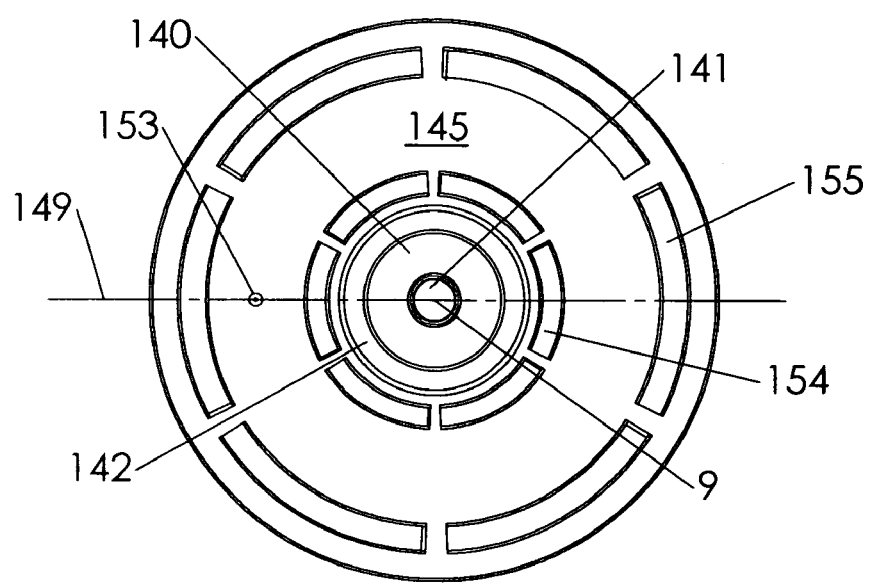
FIG. 9b is a bottom view of the excimer laser apparatus utilizing a VHF-BR-based cavity that is conically-coupled.
Figure 10:
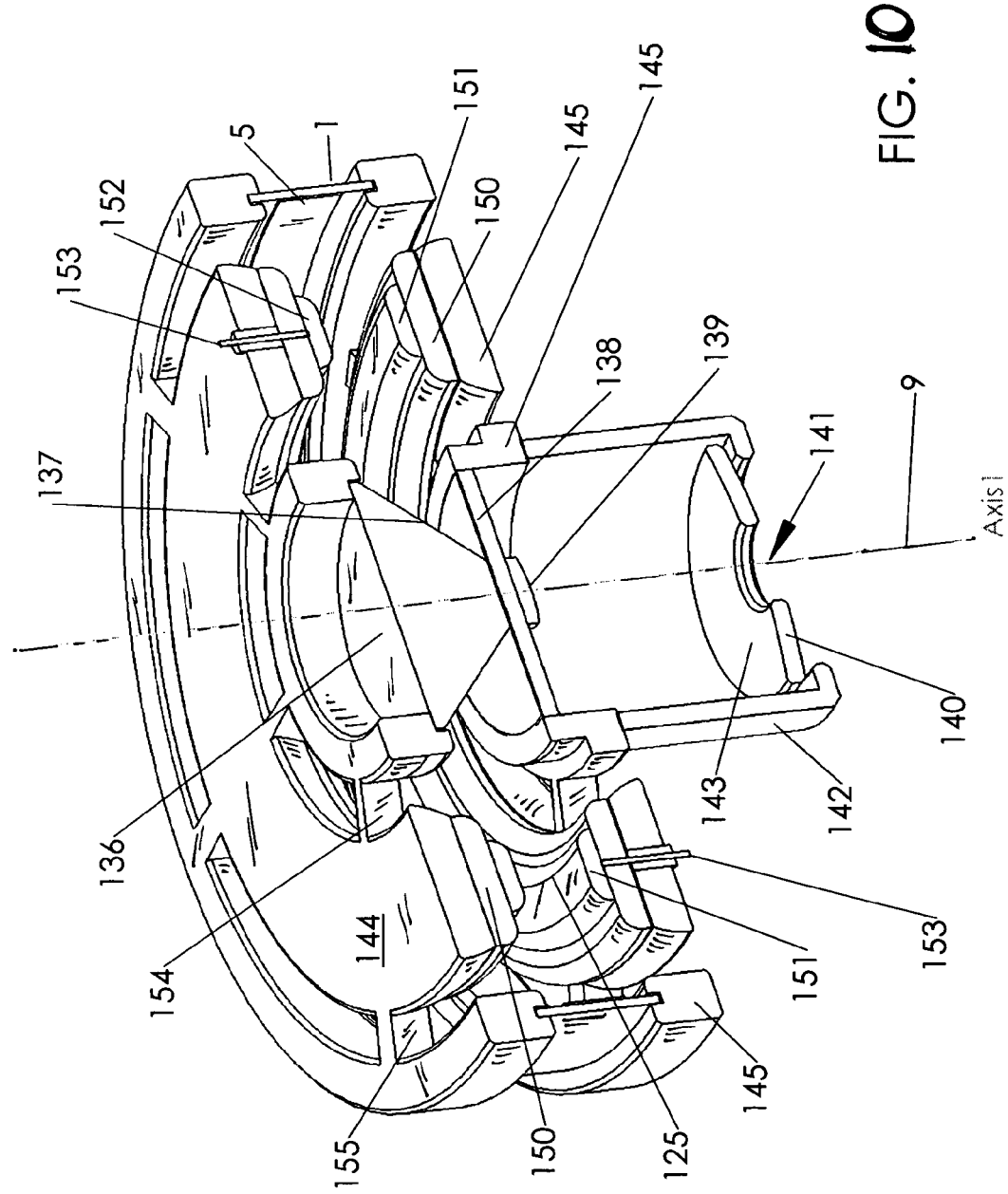
FIG. 10 is a perpective cut-away view of the excimer laser apparatus utilizing a VHF-BR-based cavity that is conically-coupled, wherein the cross-section is taken along the plane formed by axes (9) and (149).
Figure 11:
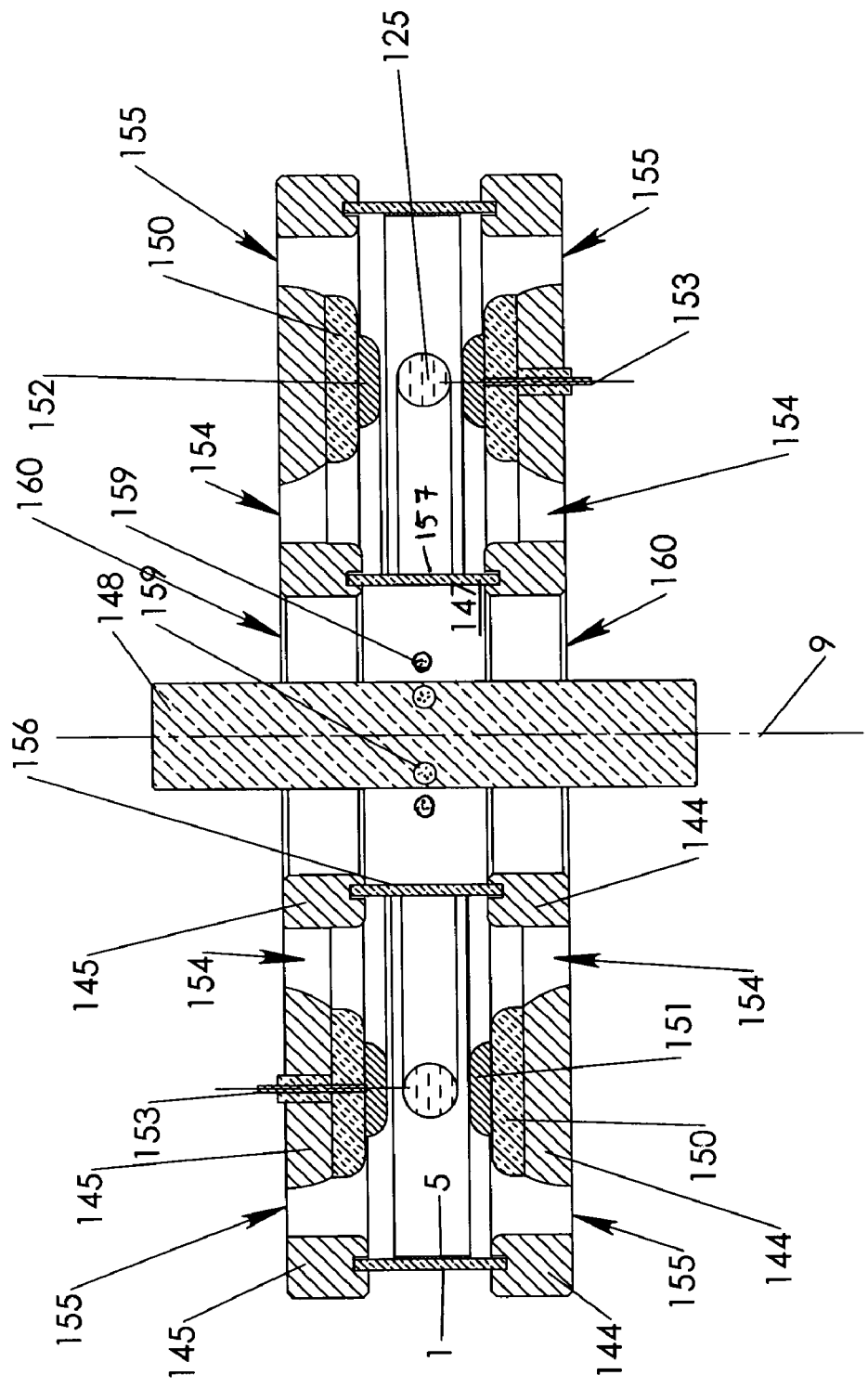
FIG. 11 is a sectional side view of an excimer laser apparatus utilizing a VHF-BR-based cavity that is cylindrically coupled, wherein the cross-section is taken along the plane formed by axes (9) and (149).
Figure 12A:
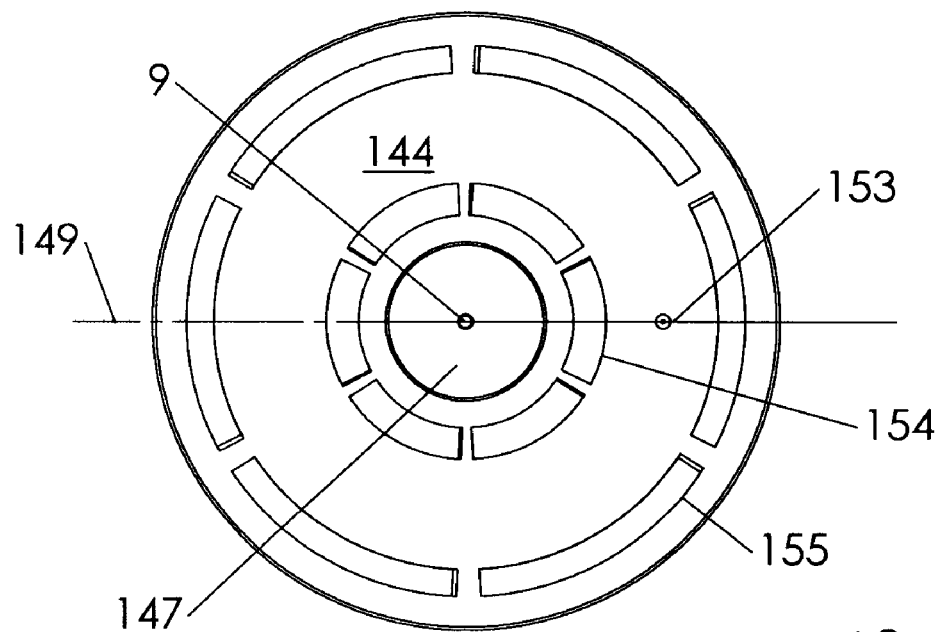
FIG. 12a is a top view of the excimer laser apparatus utilizing a VHF-BR-based cavity that is cylindrically-coupled.
Figure 12B:
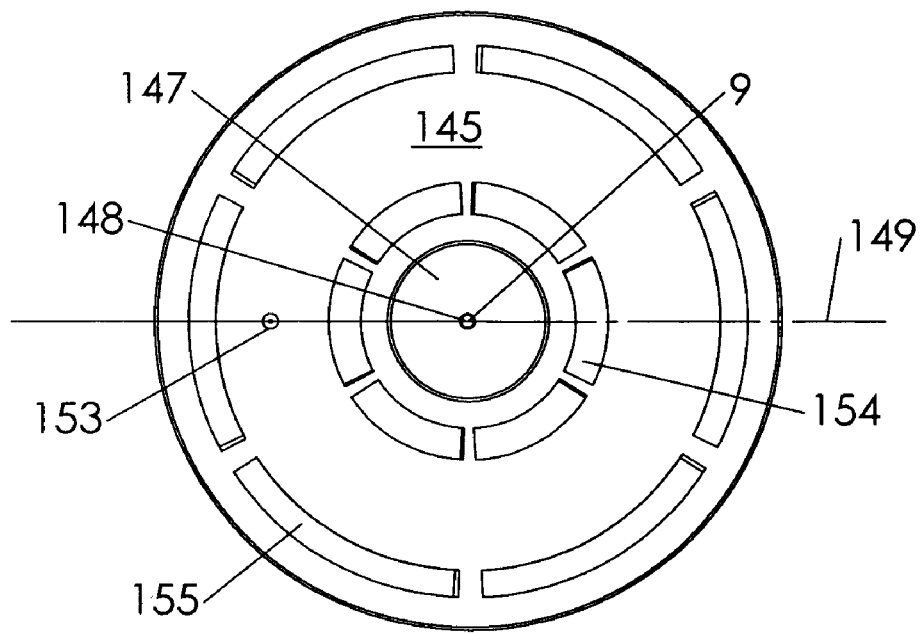
FIG. 12b is a bottom view of the excimer laser apparatus utilizing a VHF-BR-based cavity that is cylindrically-coupled.
Figure 13:
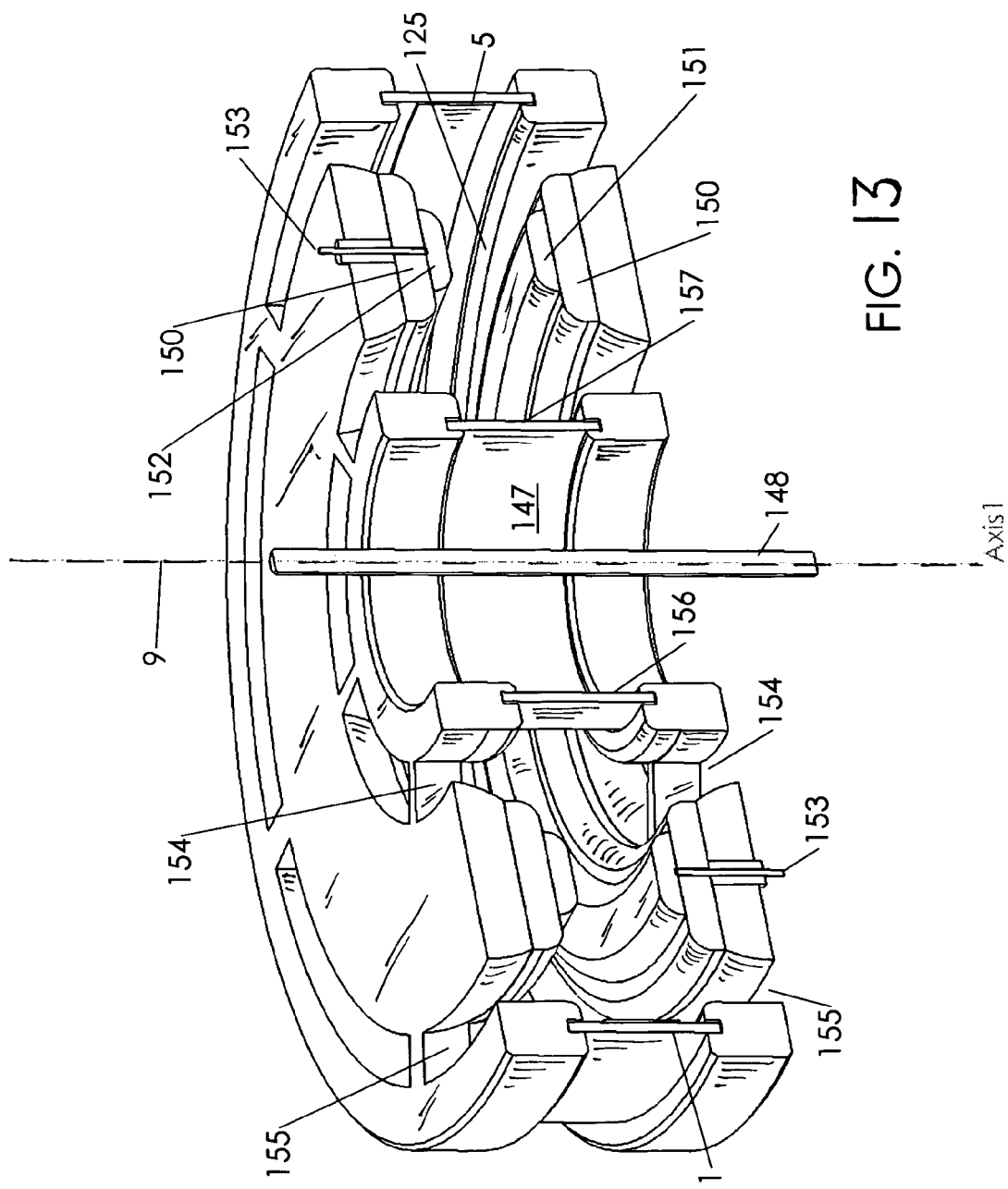
FIG. 13 is a perpective cut-away view of the excimer laser apparatus utilizing a VHF-BR-based cavity that is cylindrically-coupled, wherein the cross-section is taken along the plane formed by axes (9) and (149).

In an alternative embodiment to the telescopically coupled excimer laser in FIGS. 8-10, a similar excimer laser design may incorporate cylindrical coupling means, rather than the earlier disclosed conical coupling means. In the present cylindrically coupled embodiment, in FIGS. 11-13, the excimer is centrally coupled via a cylindrical outcoupler (156) that preferably comprises a cylindrical glass window such as fused silica (e.g. Optosil™) that is transparent to the desired laser emmission. In the case of vacuum ultraviolet emitting gain media is preferably constructed from calcium fluoride or other appropriate material. The cylindrical outcoupler provides a semi-reflecting surface for retaining and transmitting cavity light, preferably by means of a outcoupler coating (157) deposited onto the outer cylindrical surface of the cylindrical outcoupler. The first flange (144) and second flange (145) perform similarly as before, except that a process port (160) is centrally provided.

Such cylindrically coupled embodiments of the disclosed excimer laser provide a useful means for irradiating materials or a work pieces (148) that are passed through the process space (147) of the laser. Such materials that may be advantageously processed by such treatment include optical fiber preforms, gases, vapors, wires, pipes, etc. Such a process space may also find use for deposition process wherein a depositing vapor is first passed through the process space to be ionized or dissociated. In some cases wherein a process gas or vapor is to be processed in the process space, it may be possible to forgo implementation of the outcoupler coating (157), or other means for providing an outcoupler characteristic to the cylindrical outcoupler, which may then simply be a transparent window, so that such gases or vapors may then be passed through an intercavity process space.

It may also be seen that the circular VHF-BR-based cavity is useful for creating a mode structure that is also circularly symmetric, so that an essentially annular field intensity distribution (159) may be created in the process space. Such an annular field intensity may be useful for such applications as providing symmetric modification with in the interior of a glass fiber or preform, or in performing chemical vapor deposition at the surface of such cylindrical workpieces. Of course, an extra-cavity conical reflector could be readily implemented to redirect laser emissions in the process space into a parallel beam, similarly to FIG. 6. In embodiments of the disclosed excimer laser that utilize a VHF-BR that is deposited on the outside of a circular window that provides the surface of revolution, it clearly necessary that the window also be composed of a material that is transparent to the desired laser emission, similarly to the cylindrical outcoupler.

The embodiments of FIG. 6 are also applied for particular advantages in laser apparatus and optical amplifiers based on solid state media. In these embodiments, in FIGS. 14-20, a solid state medium is formed similarly to the circularly symmetric cavity of FIG. 6.

Figure 14:
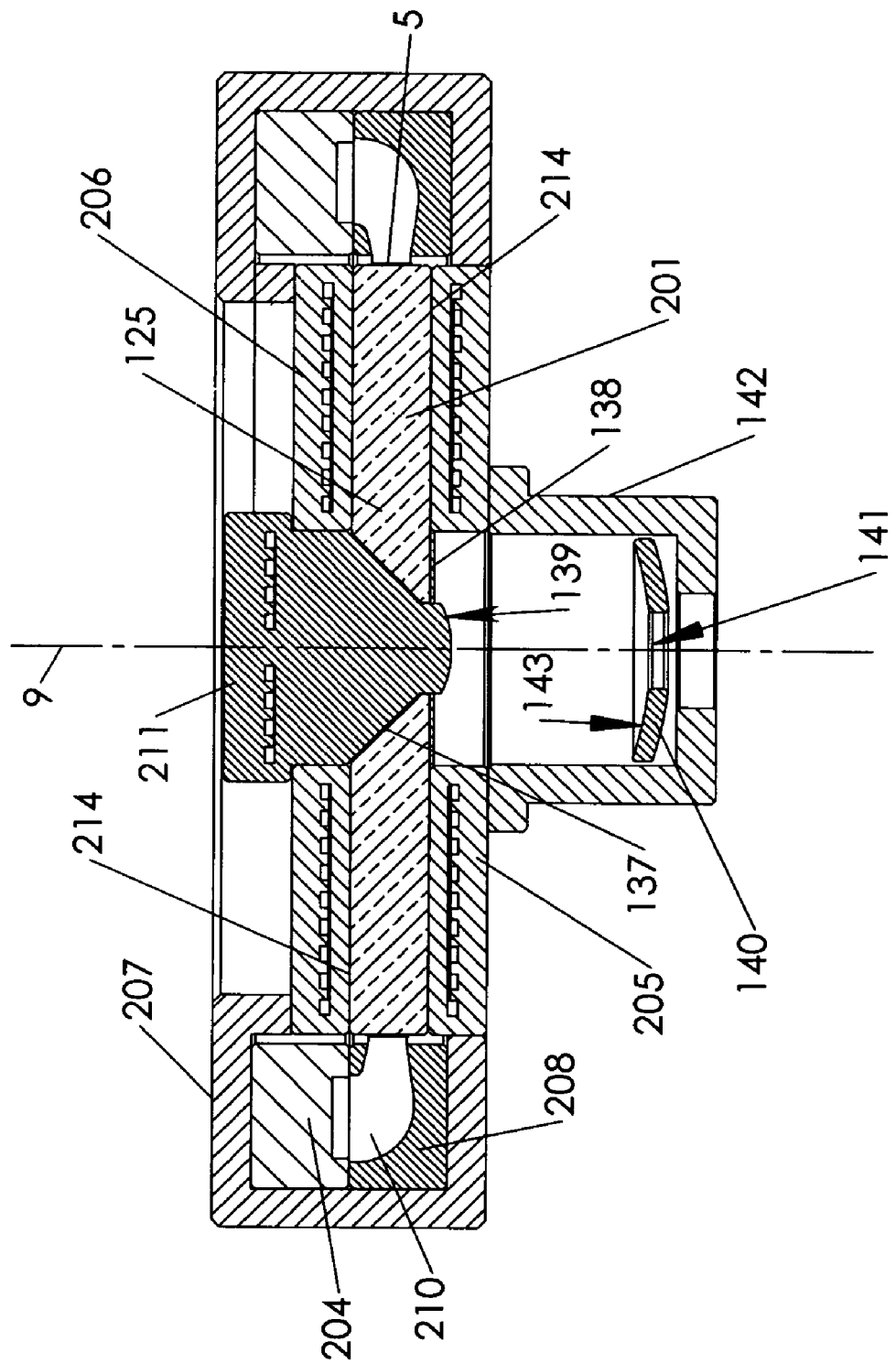
FIG. 14 is a sectional side view of a solid state laser apparatus utilizing a VHF-BR-based cavity that is conically-coupled, wherein the cross-section is taken along the plane formed by axes (9) and (149).
Figure 15A:
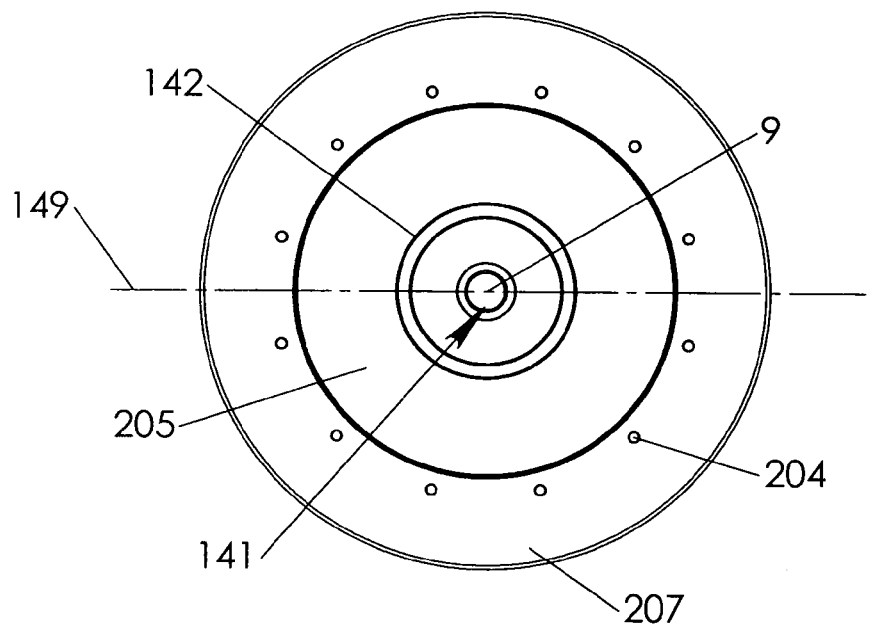
FIG. 15a is a top view of the solid state laser apparatus utilizing a VHF-BR-based cavity that is conically-coupled.
Figure 15B:
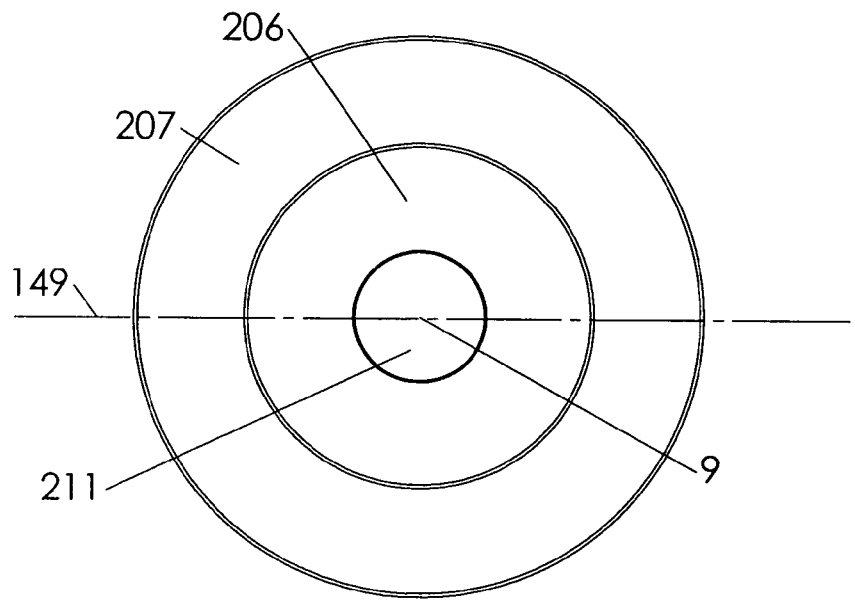
FIG. 15b is a bottom view of the solid state laser apparatus utilizing a VHF-BR-based cavity that is conically-coupled.
Figure 16:
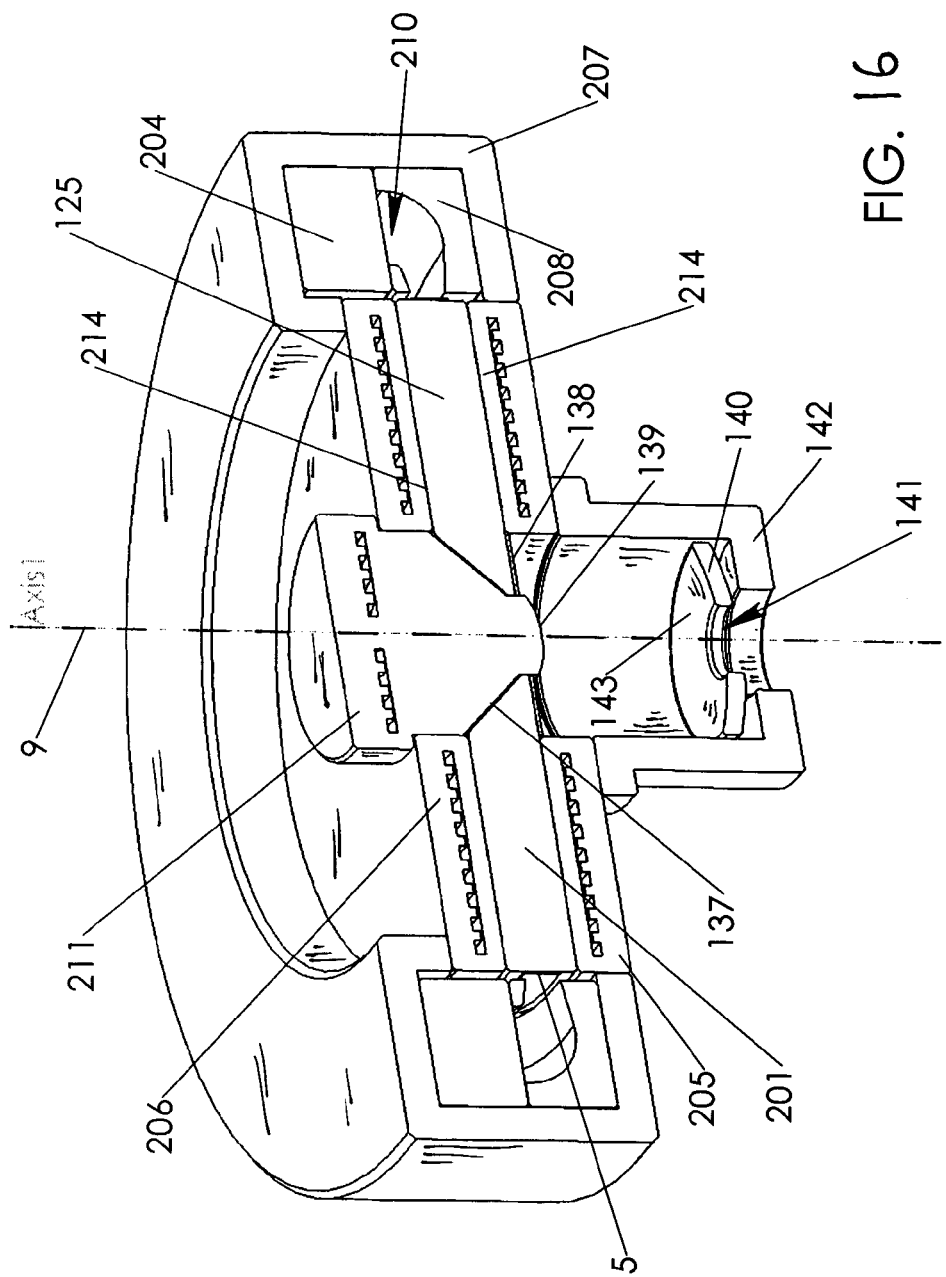
FIG. 16 is a perpective cut-away view of the solid state laser apparatus utilizing a VHF-BR-based cavity that is conically-coupled, wherein the cross-section is taken along the plane formed by axes (9) and (149).

Accordingly, the embodiments of FIGS. 14-20 incorporate a disk-shaped solid state medium (201) that has an annular aspect. The disclosed disk-shaped solid state medium possesses a first outer edge providing the specular surface-of-revolution for forming the VHF-BR (5) thereon. This outer surface of revolution is again preferably cylindrical. The disk-shaped media of FIGS. 14-20 also possess a second surface of revolution provided by the inner edge of the annular disk medium. In the embodiments of FIGS. 14-16, this second surface-of-revolution of the disk medium is a conical surface with a metallic refector deposited on the conical surface, thereby providing the conical reflective surface (137) of previous embodiments.

The conical surface is preferably temperature-controlled by a temperature-controlled central optical structure (211), which has a conical surface to provide uniform contact to the reflective coating deposited on the conical surface of the disk medium. The central optical structure (211) is preferably a monolithic struture that also incorporates the reflective surface of the secondary reflector (139). The outcoupler mirror (138) in the present embodiment is a planar mirror formed as an annulus, as in earlier embodiments, excepth that the annular outcoupler mirror may readily be formed as a semi-transparent coating, rather than a separate optical element, in the present embodiment.

The solid state media of FIGS. 14-20 are preferably optically pumped by optical pumping sources (204), which are incorporated in an edge-pumping configuration in FIGS. 14-16. In this embodiment, optical pump sources are housed in a pump housing structure (207) that also contains focusing means (208) for directing pump light into the disk medium (201). The VHF-BR (5) is transmissive to the pump source radiation.

Cooling of the disk-shaped solid state medium of FIGS. 14-20 is performed by direct cooling through the planar faces (214), so that such cooling of the disk faces may provide control of the temperature in the disk-shaped gain medium, thereby providing a uniform temperature distribution in the gain medium. Such cooling of the faces is increasingly effective as disk media are fabricated with increasingly small aspect ratios, and smaller thicknesses, d, are utilized. The cooling of the faces is performed by first and second cooling plates (205 & 206) which may alternatively house additional optical pumping means. The cooling plates are preferably bonded to the disk (201) via a high thermal conductivity layer at the interface between the plate and disk. This bonding layer may be formed on the disk faces (214), where it is deposited over an optical layer that is reflective to the pump radiation, as well as preferably absorbing of the propagation of unwanted cavity modes, thereby frustrating TIR of such unwanted modes.

Figure 17:
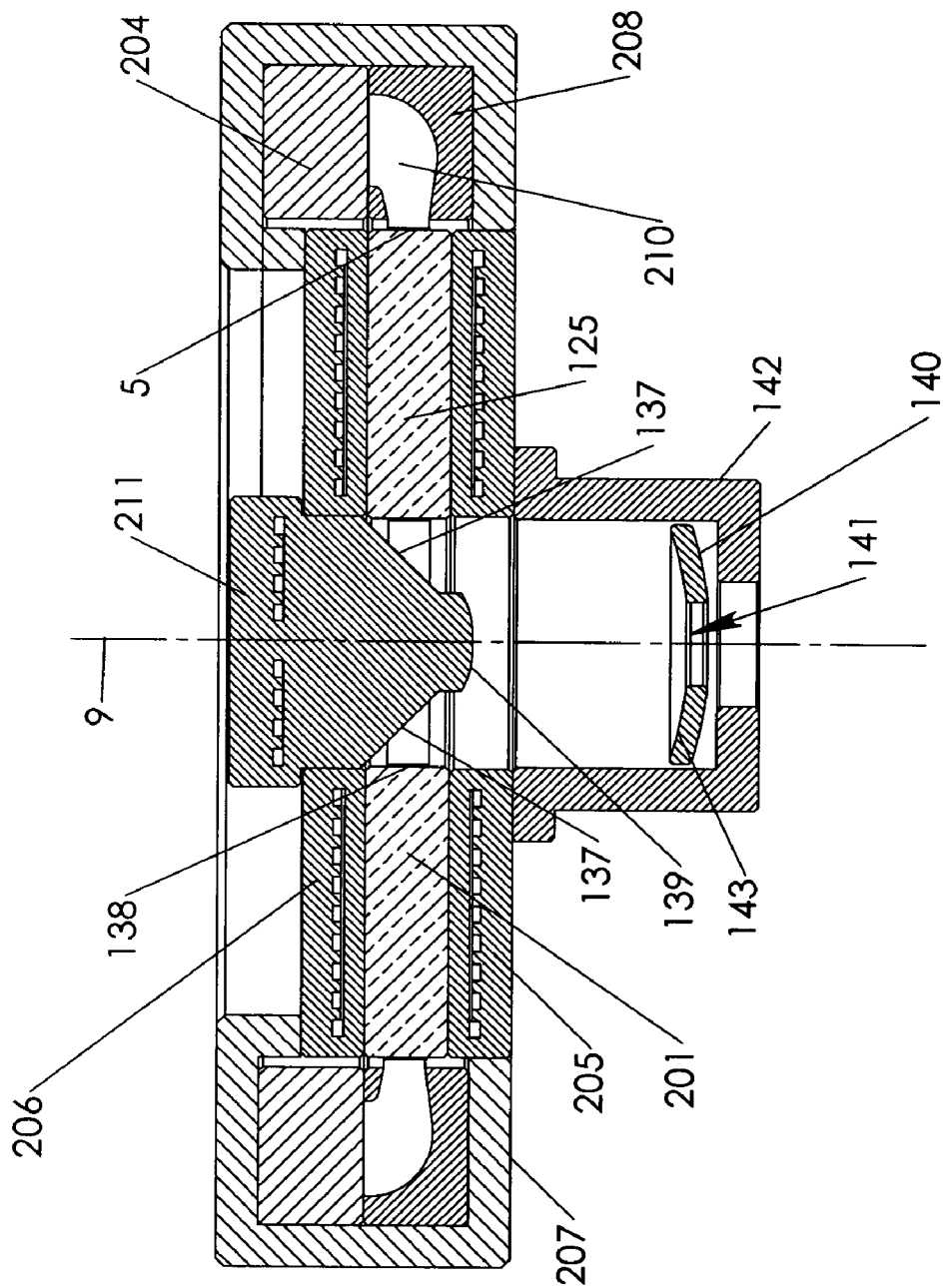
FIG. 17 is a sectional side view of an alternative solid state laser apparatus utilizing a VHF-BR-based cavity that is cylindrically-coupled to a conical reflector and beam-condenser, wherein the cross-section is taken along the plane formed by axes (9) and (149).

An alternate embodiment to the disk laser apparatus of FIGS. 14-16 utilizes a disk-shaped solid state gain medium with an annular aspect, except that the second, inner, surface-of-revolution is a cylindrical surface, in FIG. 17. As previously, a outcoupling mirror (138) is utilized, in FIG. 17, that comprises a coating deposited over the cylindrical inner surface. As in the embodiments of FIGS. 14-16, a central optical structure (211) provides the secondary reflector (139), but also provides a the conical reflector surface (138) as an extra-cavity mirror. As before, beam condensation means are provided via the primary reflector (140) and secondary reflector, with optical housing means (142) attached to the first cooling plate.

Figure 19A:
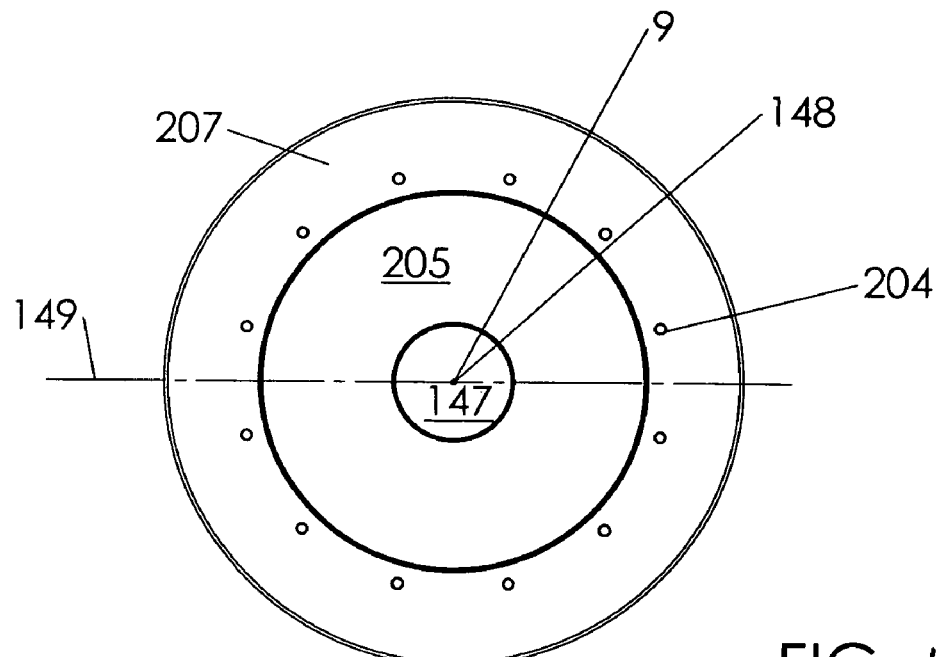
FIG. 19a is a top view of the solid state laser apparatus utilizing a VHF-BR-based cavity that is cylindrically-coupled.
Figure 19B:
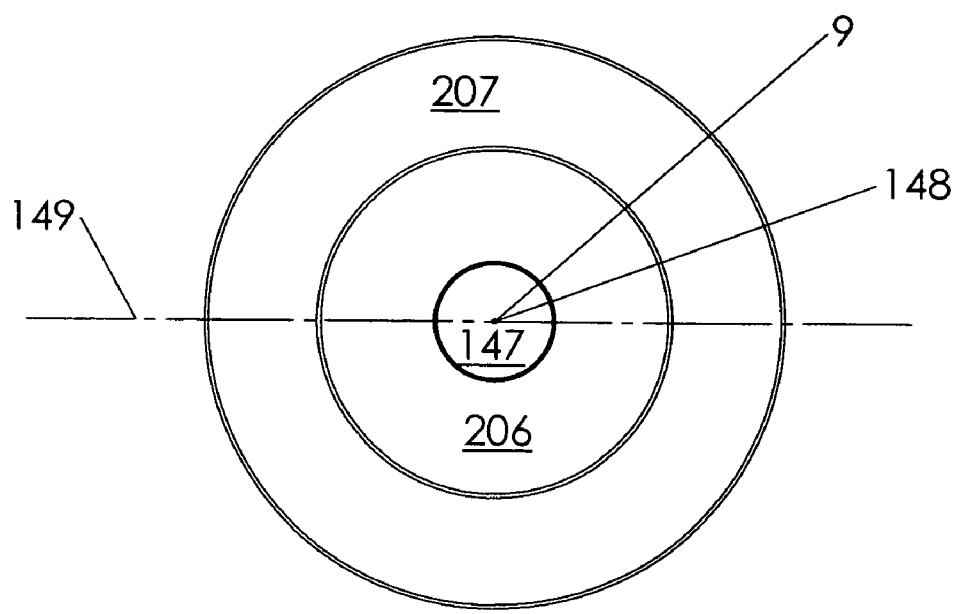
FIG. 19b is a bottom view of the solid state laser apparatus utilizing a VHF-BR-based cavity that is cylindrically-coupled.
Figure 20:
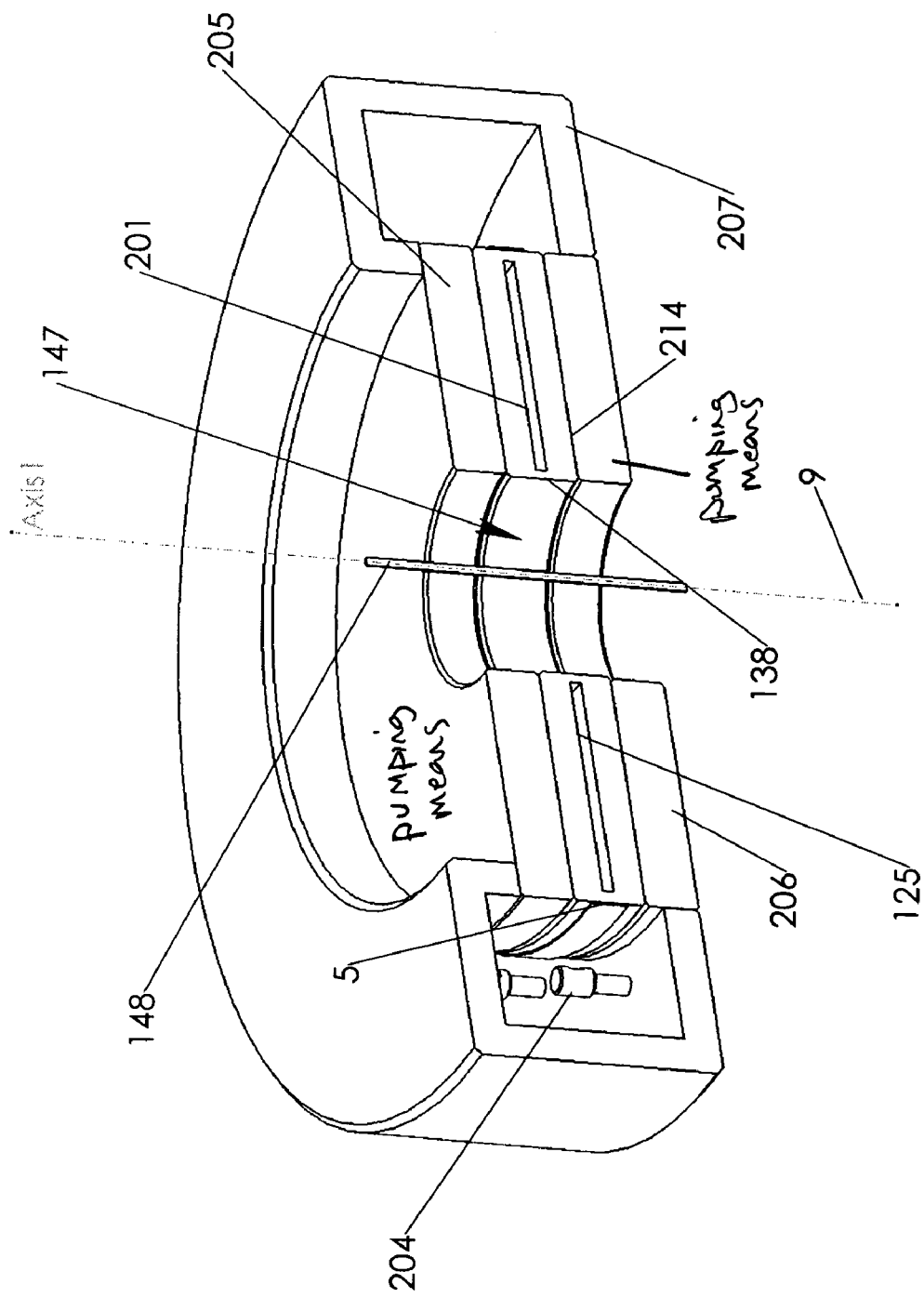
FIG. 20 is a perpective cut-away view of the solid state laser apparatus utilizing a VHF-BR-based cavity that is cylindrically-coupled, wherein the cross-section is taken along the plane formed by axes (9) and (149).

Another embodiment of a solid state laser apparatus utilizing a VHF-BR-based cavity and disk-shaped gain medium, in FIGS. 18-20, utilizes the same annular disk medium of FIG. 17, except that it is face-pumped by cooling plates that incorporate optical pumping sources therein.

The disclosed VHF-BR used for mode-discrimination in solid state media cab also be use in solid state media that do not possess a surface-of-revolution. In another embodiment, the VHF-BR is made a reflecting mirror in polygonal solid state media having a "slab" characteristic. Polygonal solid state cavities that are seen to benefit most from use of a VHF-BR cavity mirror are those in which the medium has opposing faces that have a dimension substantially longer than other dimensions of the medium, and in particular, considerably longer than the dimension defined by the thickness between the two faces. Such a medium is used in conjunction with a VHF-BR, in FIG. 21, to provide a means for reducing propagating modes to those having propagation directions orthogonal to the VHF-BR. A solid state slab module (300) of the preferred embodiments is fabricated using a rectangular gain medium (301). The rectangular gain medium has, in addition to a relatively small dimension along thickness axis (303) between its larger parallel faces, also two parallel optical faces between which propagation is orthogonally reflected, such propagation parallel to lateral axis (309). The optical faces are thus those parallel to axes (303) and (304). One face, which is terminated with the VHF-BR, provides a high reflectance mirror for the propagation, whereas the other surface is an outcoupling mirror (302), or in the case of an optical amplifier, the outcoupling mirror may be substituted by an antireflection coating. Due to the VHF-BR, unwanted propagation (315), which propagates non-orthogonally to the VHF-BR, is allowed to exit the cavity, so that only orthogonal propagation is effectively pumped. In addition top and bottom faces of the cavity may be coated with an absorbing layer (310) that additionally reduces any TIR of the unwanted propagation.

Figure 22:
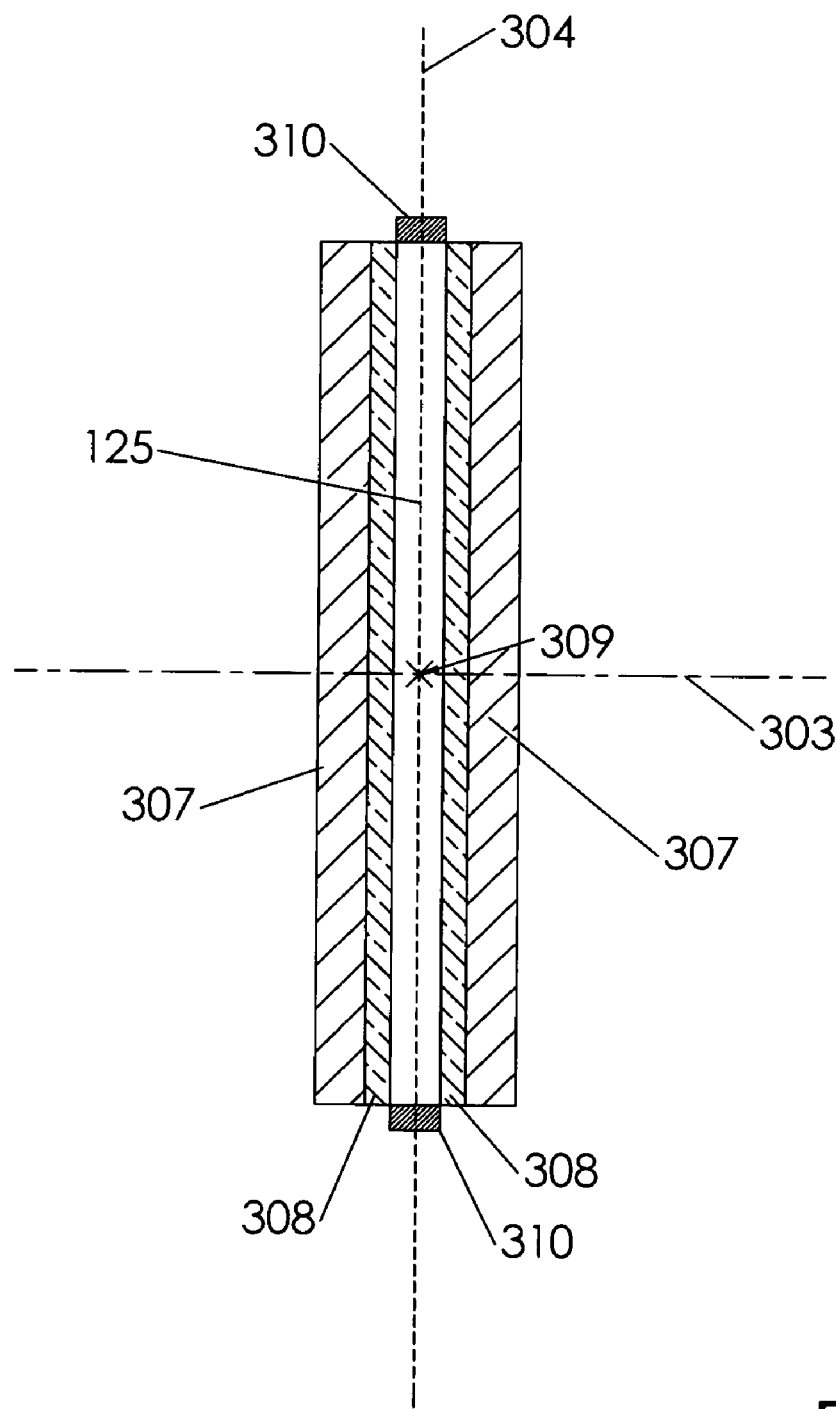
FIG. 22 is a sectional side-view of the slab-shaped solid state cavity structure, wherein the cross-section is taken along the plane formed by axes (303) and (304).
Figure 23:
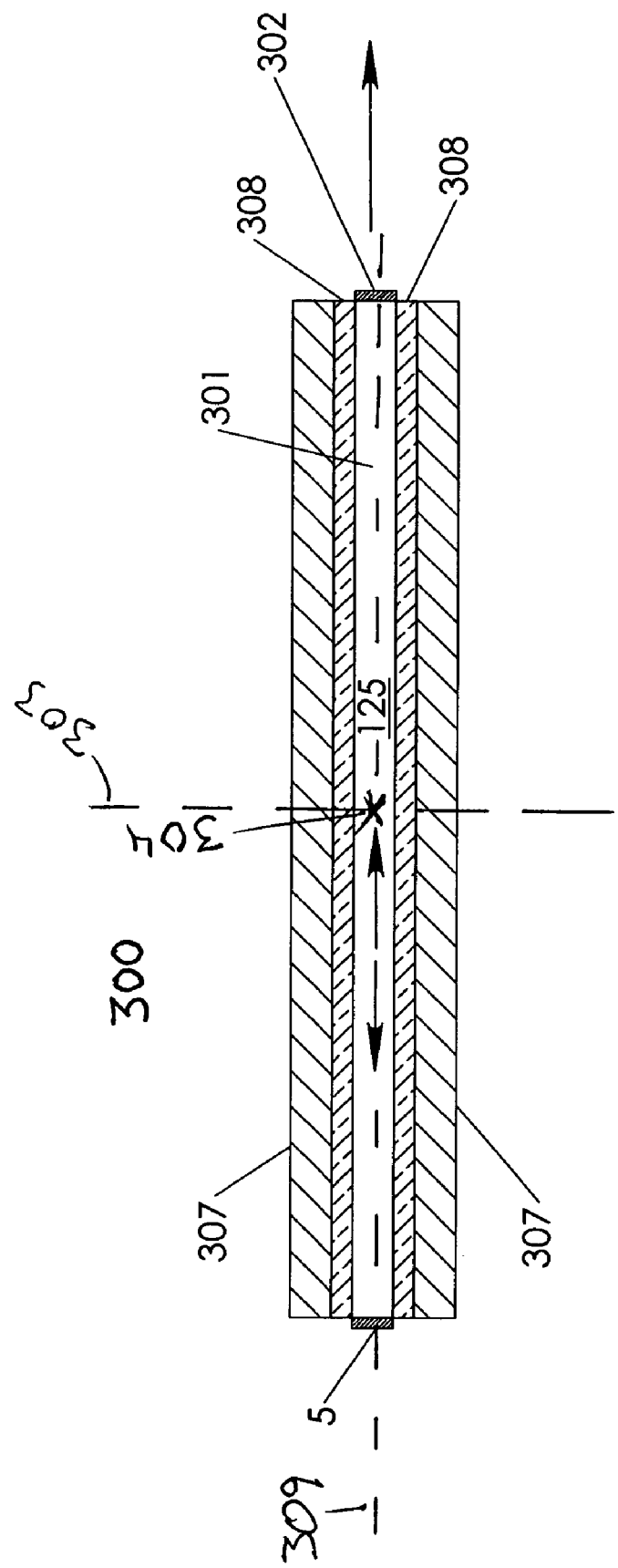
FIG. 23 is a sectional top-view of the slab-shaped solid state cavity structure, wherein the cross-section is taken along the plane formed by axes (303) and (309).

This rectangular slab geometry allows for the larger faces, parallel to axes (304) and (309), to be efficiently cooled, in FIGS. 22-23 by cooling structures (307) that also provide for optical face-pumping of the slab. Such simultaneous pumping and cooling of the large faces may be provided in a very uniform fashion on both sides of the slab, since no cavity radiation is to be coupled form these larger faces. In addition, intermediate layers (308) may be utilized for specifically absorbing unwanted cavity propagation, high thermal conductivity to cooling structures, and transmission of pump radiation.

Figure 21:
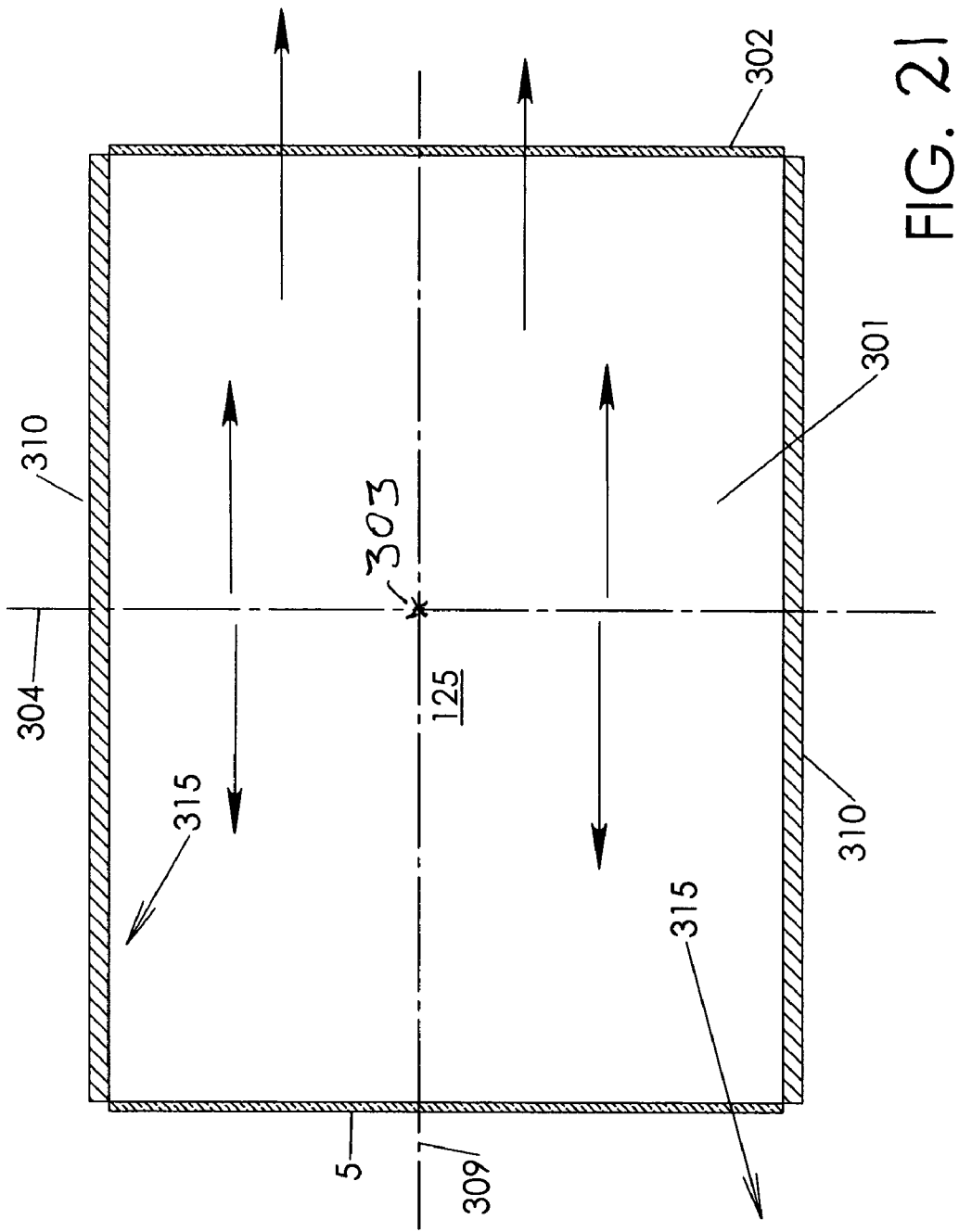
FIG. 21 is a sectional side-view of a slab-shaped solid state cavity structure, wherein the cross-section is taken along the plane formed by axes (304) and (309).
Figure 24:
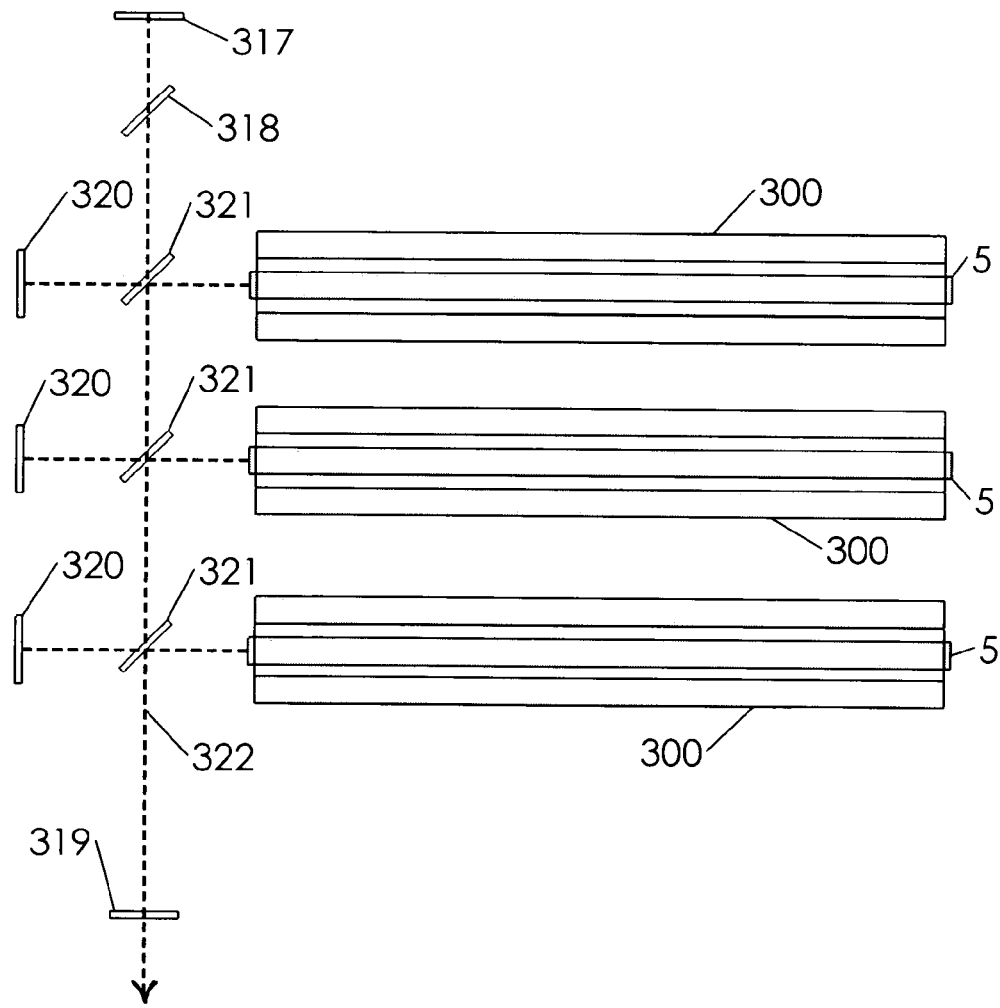
FIG. 24 is a schematic of a laser apparatus incorporating a multitude of the slab-shaped solid state cavity structures.

In the case that the outcoupling mirror of FIGS. 21-23 is substituted by an antireflection coating, and the module (300) comprises an optical amplifier, then a multitude of such amplifiers may then be optically coupled together to form a high-power laser, in FIG. 24. Such coupling may be realized through 45° beamsplitter mirrors (321) and beamsplitter high-reflectance mirrors (320), the combination being readily available in the form of beamsplitter cubes. A Brewster window (318) may be optionally used for polarization control. A high reflectance mirror (317) and outcoupler mirror (319) complete the laser cavity, providing confinement and outcoupling of the optical beam (322).

Figure 25:
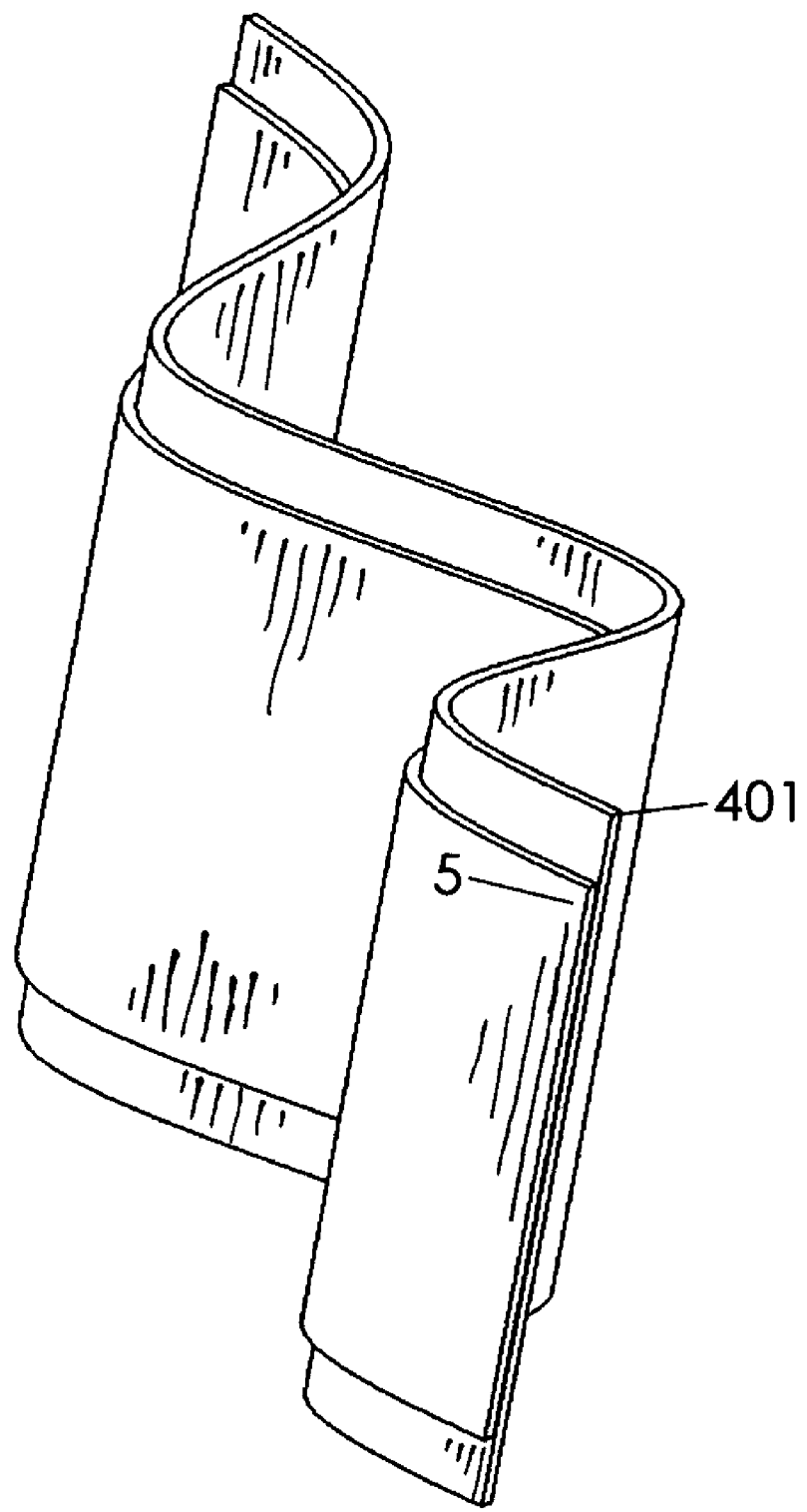
FIG. 25 is a persective view of a flexible VHF-BR on a flexible substrate.

A polymer-based VHF-BR, in FIG. 25, provides another embodiment wherein the VHF-BR (5) is a flexible structure that is, in one embodiment, deposited onto a flexible plastic film (401). Because of the low optical extinction possessed by many polymers, such polymers are attractive materials from which to fabricate the VHF-BR. A characteristic of polymers that can inhibit the high finesse characteristic of the disclosed VHF-BR, however, is birefringence. While very substantial birefringence is found in thin film polymers that are produced by the standard manufacturing processes of polymer film, such optical anisotropy is much more easily avoided in vacuum-deposited polymers, since mechanical, linear stretching is not required. In addition, orientation of polymer chains within vacuum-deposited polymer films may be further manipulated through a variety of means, including utilizing a low index oxide—such as $SiO_2$—as either the low-index or high-index layer. Such use of an underlying material to provide a molecular template by which a subsequently deposited polymer film is preferentially randomized or oriented will be considered herein as a subset of epitaxial means. Other epitaxial means may be provided by use of a particular polymer or surface treatment. Other means for manipulating the orientation of polymer films as they deposit may include exposure of the deposited film to various plasma, electron beam, UV exposures, or electrostatic forces during deposition.

In one alternative embodiment, the polymer-based VHF-BR (either polymer-polymer or polymer-oxide) may be deposited onto a flexible or rigid substrate that is previously treated with a release layer, so that, in this particular embodiment, the VHF-BR may subsequently be separated (released) from the substrate, so that the VHF-BR may be utilized in subsequent applications in which it is preferable to have the substrate absent.

The releasable VHF-BR is particularly suited for acquiring reliable surface properties from a polymer-based VHF-BR that is desired for its flexible properties, since such a VHF-BR may be first deposited onto an extremely smooth and optically precise substrate that possesses a more precisely controlled surface than is typically possible to achieve in flexible substrates (e.g., Mylar®). Release agents may comprise a material that can be preferentially etched, a soluble material, a material with low-surface energy, or any other appropriate release agent.

The polymer-based VHF-BR, in FIG. 25, may then be utilized in a wide variety of applications, including but not limited to lamination of the disclosed optical cavity, short-pass filtering, decorative applications, flexible electronics, flexible displays, etc. In the event that the polymer-based VHF-BR is utilized in laser construction, the polymer-based VHF-BR could be bonded to the surface of, for example, a solid-state laser medium to provide a mode selecting cavity reflector as discussed previously. Such application would not require a low-index cavity in certain slab-cavity lasers.

The thin film VHF-BR of the disclosed plastic laser cavity may comprise alternating layers of organic material; or, alternatively, alternating layers of an organic material and an inorganic material. Also, while the VHF-BR may be deposited onto a glass substrate, as discussed earlier, it may alternatively be deposited onto a plastic film, so that the VHF-BR/film may then be applied over a separate substrate having the surface of revolution. In the case that the VHF-BR comprises alternating layers of a polymer and an inorganic oxide, the surface morphology of the deposited oxide film may be made to possess either a sheer, smooth microstructure, or it may be a rough microstructure. While the smooth microstructure is typically much more commonly specified for laser coatings, the relatively rough microstructure may be found advantageous in certain circumstances wherein more diffuse boundaries between layers of different refractive index are useful, such as when rugate properties are desirable, or when the VHF-BR is required to provide increased flexibility or thermal cycling.

Because the disclosed cavity structures of previous embodiments are formed by a single surface of revolution, fabrication of the VHF-BR may be performed in a highly precise manner. The deposition of well-controlled and homogenous layers is accomplished by rotating the circular substrate so that its surface of revolution is continuously passed by the deposition source at a rapid speed. The rapidly rotating substrate is then provided a very even coating by each vapor source. As is taught in the prior art of vacuum deposition of polymer thin films, formation of the polymer thin film is performed via first depositing a layer of a monomer or oligimer and, second, curing the layer to polymerize into a polymer film. Water or gas cooling of the substrate may be performed to more reliably determine the condensation behavior of the organic vapor.

The curing for polymerization of the monomer/oligimer layer may be performed by the various methods discussed in the polymer thin film art, including ultraviolet, electron beam, and plasma curing. Such curing means may be provided by commercially available modular sources that may be mounted in the vacuum-processing chamber.

In the case that the VHF-BR is to be deposited onto a thin plastic film, such as a Mylar®) film, the flexible substrate may be mounted onto a cooled rotating drum, as is commonly practiced in the web coating art. In some cases, the VHF-BR may possibly be deposited in a continuous roll-to-roll web-coating configuration, though, the VHF-BR is, in this preferred embodiment, deposited onto a single, rapidly spinning drum, so that layer thickness and homogeneity may be precisely controlled.

Because the flux of uncured monomer/oligimer to the substrate is quite small, very little heat removal capacity is required. Either gas or liquid cooling of the substrate may perform substrate cooling, as required. It is preferred that an optical monitor monitors the depositing VHF-BR, preferably both in reflectance and transmission, so that slight changes in intensity may be monitored in the beginning of deposition.

In the case of a previous embodiment, wherein the cavity contains a gaseous or liquid gain medium, the surface of revolution may reside on the interior surface of a rigid circular substrate, as in FIGS. 3-4. In this latter case the deposition may accordingly be performed with the vapor source depositing material on the rotating substrate from the inside, wherein the substrate must then be secured by its external surface.

The monomer vapor source may be any monomer vapor source of the prior art, including but not limited to flash evaporation, boat evaporation, Vacuum Monomer Technique (VMT), polymer multilayer (PML) techniques, evaporation from a permeable membrane, or any other source found effective for producing a monomer vapor. For example, the monomer vapor may be created from various permeable metal frits, as previously in the art of monomer deposition. Such methods are taught in US patents U.S. Pat. No. 5,536,323 (Kirlin) and U.S. Pat. No. 5,711,816 (Kirlin), amongst others.

For formation of the VHF-BR structures, the vacuum deposition sources may be specified variously, depending on which of the various embodiments of the invention discussed are to be formed. For formation of the VHF-BR onto a polymer, whether the polymer is the flexible substrate or an underlying cured polymer film, the inorganic layer is first deposited by an inorganic vapor source, which, in the first preferred embodiment, is a magnetron sputter source as is commonly used for deposition of inorganics in the prior art. The magnetron may be of the unbalanced magnetron design for providing sufficient activation of the deposited inorganic during deposition. For formation of the VHF-BR, the magnetron source may be operated under a wide variety of operating conditions, depending on the material being deposited, the condition of the underlying substrate, the substrate temperature, partial pressures of reactive gas, total operating pressure, magnetron power, distance between the magnetron sputter source and the substrate, etc.

Deposition means for the inorganic material may be any method used for vacuum deposition, including but not limited to chemical vapor deposition, plasma enhanced chemical vapor deposition, sputtering, atomic-layer deposition (ALD), electron beam evaporation, electron cyclotron resonance source-plasma enhanced chemical vapor deposition (ECR-PECVD) and combinations thereof.

The ability to provide a high cavity quality Q for a very limited solid angle of reflection, $\Delta\theta_r$, as provided by the operational principles set forth herein, VHF-BR-based optical cavities may be fabricated with gain volumes possessing an unusually small aspect ratio. Such aspect ratios may correspond to essentially a cavity that has a thickness corresponding to that typical of optical fiber cores, and accordingly, may be so thin that d is on the order of the gain wavelength.

In one embodiment of the invention, circular VHF-BR-based optical cavities with very thin aspects are formed in thin layers (1 um<d<1000 um) of dielectric material formed on a supporting planar substrate. Such a dielectric cavity layer may be formed by the various vapor deposition methods that are commonly used for forming dielectric layers on substrates, such as chemical vapor deposition, sputtering, evaporation, etc. The dielectric material may be any suitable dielectric, but is preferably high-purity silicon dioxide. Whereas earlier embodiments of the disclosed VHF-BR-based optical cavities utilized VHF-BR's wherein the low-index layers and high-index layers are preferably formed by vapor deposition of the layers onto a substrate having the surface of revolution, the present embodiment preferably utilizes localized modification of a single dielectric layer on a planar substrate to form the concentric rings of the circular VHF-BR within the dielectric layer. Accordingly, the high-index layers and low-index layers of the VHF-BR are formed, in this embodiment, to provide a much smaller cavity thickness, d, than is readily accomplished in earlier embodiments.

The planar substrate (501) may comprise various materials or multilayer structures, but is preferably a polished silicon wafer of high flatness (e.g., $\lambda/4$ at 530 nm) that is subsequently processed to have an additional, preferably high-index, substrate cladding layer (502) formed over the planar surface, in FIG. 26, so that the planar surface is terminated with a layer that forms a high-index cladding layer for the dielectric cavity layer (503) to be subsequently formed thereon. The term "high-index" will refer to the refractive index of any optical material possessing a higher refractive index than that of the dielectric cavity layer. The dielectric cavity layer (503), preferably silicon dioxide, is then formed on the planar surface of the planar substrate. A circular VHF-BR (504) is then formed within the dielectric cavity layer preferably by using local modification to form the high-index layers of the of the VHF-BR. Once the VHF-BR is formed, a planar VHF-BR-based cavity is thus formed, wherein a cavity interior volume (505) is formed by the unmodified portion of the dielectric cavity layer (503) that resides within the circular VHF-BR. This cavity interior volume is, in addition, preferably transformed into a gain volume by diffusion of a suitable gain material into the heretofore unmodified cavity interior volume. Such a suitable gain material may comprise various rare earth ions, such as Er, Nb, Yb, Pr, etc. Doping of the cavity interior volume by rare earth ions may be achieved by various methods taught previously, such as by deposition of a thin layer of the rare earth material onto the portion of the dielectric cavity layer (503) comprising the cavity interior volume (505), followed by a heat reatment to diffuse the rare earth species into the cavity interior volume, so that a gain volume is formed in the dielectric cavity layer. Alternatively, ion-implantation may be used for attaining similar results. In some instances, it may be preferable to form the cavity interior volume initially as a doped gain material during the formation of original dielectric cavity layer (503). Henceforth, the cavity interior volume (505) is considered herein as identical to a gain volume in embodiments wherein gain is desirable.

Figure 27:
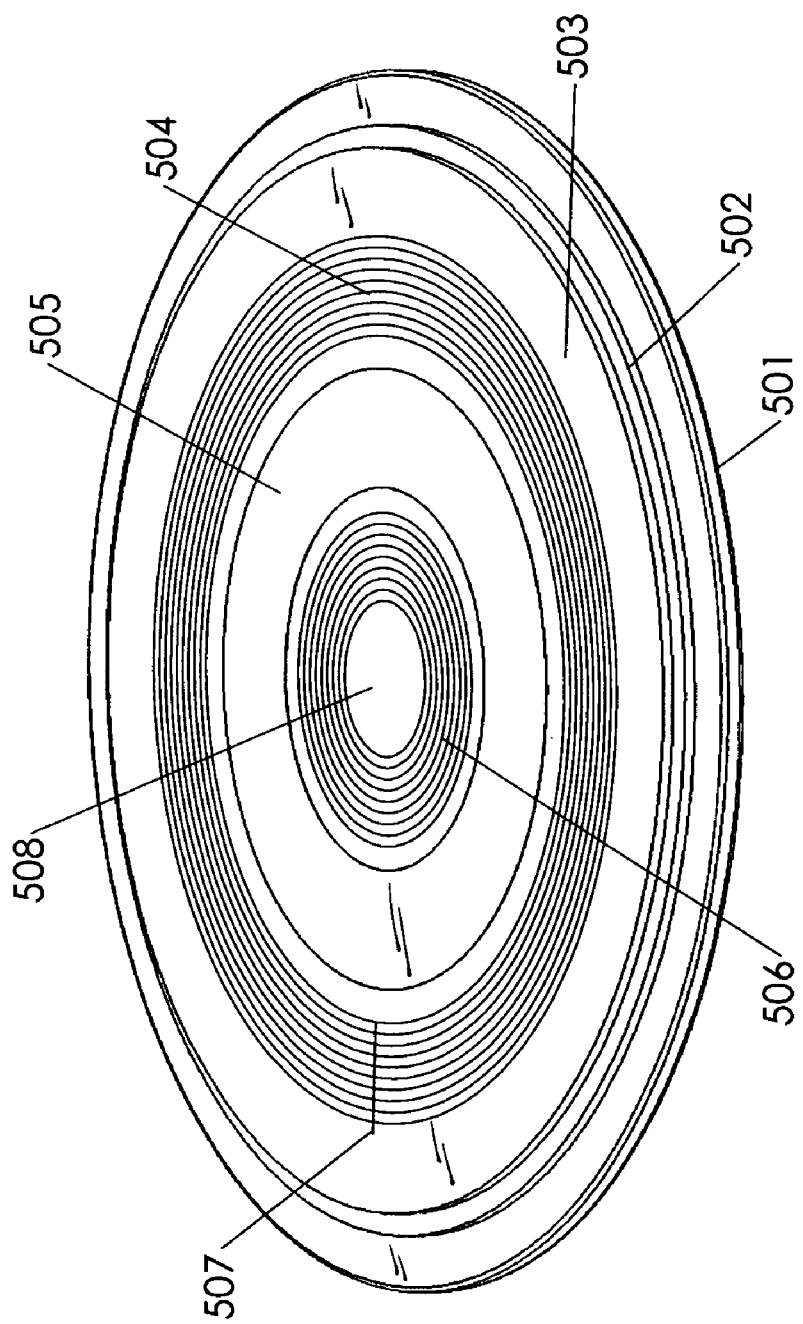
FIG. 27 is a perspective view of a planar double-VHF-BR-based cavity formed on a planar substrate.

In FIG. 27, planar double-VHF-BR-based cavity is disclosed as an alternative embodiment, wherein a second VHF-BR (506) is incorporated into the dielectric cavity layer. In this embodiment of a double-VHF-BR, the gain volume (505) is then formed as an annular region in the dielectric cavity layer, so that either of the two VHF-BR's of FIG. 27 may be fabricated to provide outcoupling characteristics, either by being fabricated with less reflectivity (smaller p, or smaller $\Delta n$), or by further processing the dielectric layer to provide a linear-path outcoupler (507) through the VHF-BR. The linear-path outcoupler (507) may comprise a linear path that is formed by making the index modulation (or, $\Delta n$) of the VHF-BR less along the linear path. This may readily be performed through selective use of known UV exposure methods described and referred to herein. An extra-cavity region (508) is thus formed in the cavity structure, in FIG. 27, which may be utilized to position various structures for subsequent use of cavity light emitted into this central region.

The dielectric layer is modified by index-modification means to contain a VHF-BR-based cavity. This modification is achieved by utilizing methods and apparatus that provide a localized modification of the refractive index of the dielectric layer, usually comprising a slight increase over the refractive index of the pre-existing dielectric layer.

Figure 26:
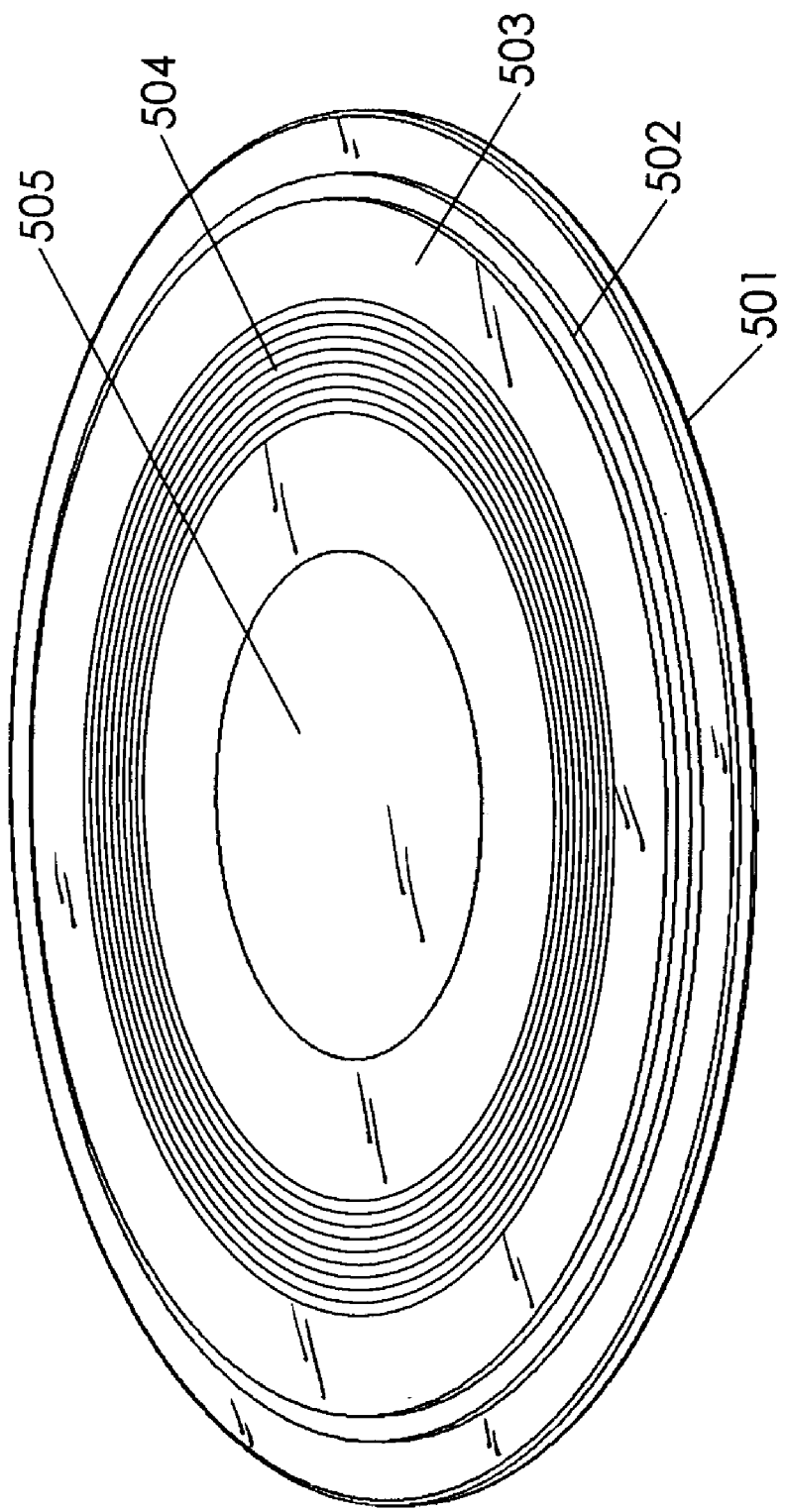
FIG. 26 is a perspective view of a planar VHF-BR-based cavity formed on a planar substrate.
Figure 28:
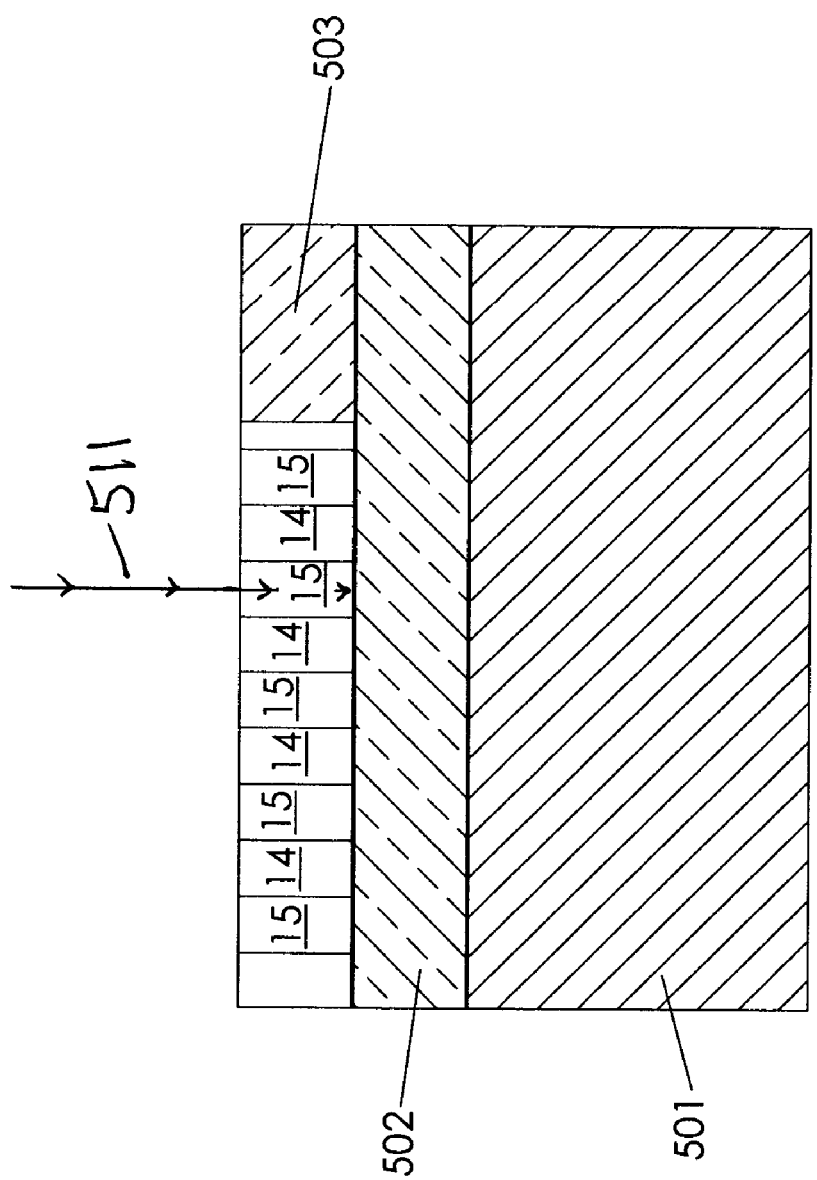
FIG. 28 is a magnified sectional side-view of the planar VHF-BR-based cavity.

A magnified section of the planar VHF-BR-based cavity as embodied in FIGS. 26-27, in FIG. 28, shows the planar dielectric cavity layer (503) is modified to form the consecutive concentric layered regions of low-index layers (14) and high-index layers (15) needed to form the VHF-BR. Modification is preferably performed by ultraviolet irradiation by an ultraviolet laser beam (511), which is preferably directed only to those regions of the dielectric cavity layer where the high index layers (15) are to be formed, wherein the index of the irradiated region is slightly increased. Similar methods as those discussed are well-known and practiced commercially in the prior art for modification of $SiO_2$ fibers into fiber gratings, such as in U.S. Pat. Nos. 5,732,170 and 6,125,225, which are included herein by reference.

Figure 29:
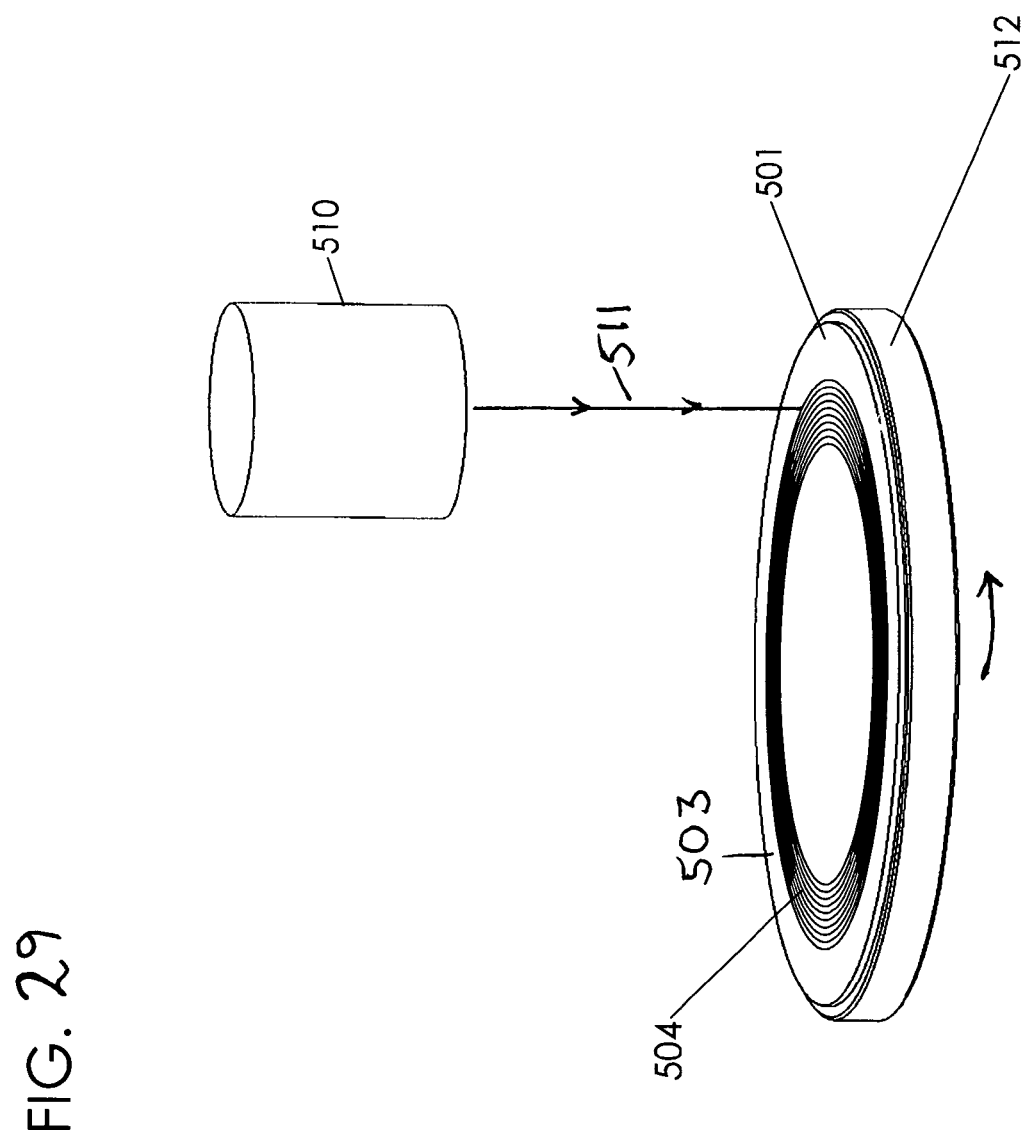
FIG. 29 is a perpective view if a laser scanning apparatus used for forming a planar VHF-BR-based cavity.

FIG. 29, a laser scanner set-up is used to provide modification of the dielectric cavity layer (503) to form the high index layers (15) in FIG. 28. A UV laser scanner (510) provides a scanned laser beam (511) that is directed onto the portion of the dielectric cavity layer in which the VHF-BR is to be formed. The ring-shaped pattern of the circular VHF-BR is formed by rotating the planar substrate/cavity layer during laser modification via a rotating wafer chuck (512), so that the laser scanner is only required to advance the laser beam in a linearly to provide the required circular pattern.

Alternatively, the dielectric cavity layer may be selectively coated with a layer of dopant material, such as Germanium, in concentric ring-shaped regions of the dielectric cavity layer where the high index properties are needed to form the VHF-BR. The layer of dopant material may be patterned via photoresist-based lithography methods common in semiconductor manufacturing. Exposure of the photoresist with the annular pattern corresponding to the high-index layers of the desired VHF-BR may alternatively be accomplished by means of the exposure methods previously outlined for directly modifying the $SiO_2$ layer with UV light. After obtaining the concentrically patterned layer of Germanium, or other suitable dopant, on top of the $SiO_2$ layer, the resulting assembly may then be annealled so as to diffuse the dopant into the $SiO_2$ layer, thereby forming the high-index layers of desired VHF-BR.

Figure 30:
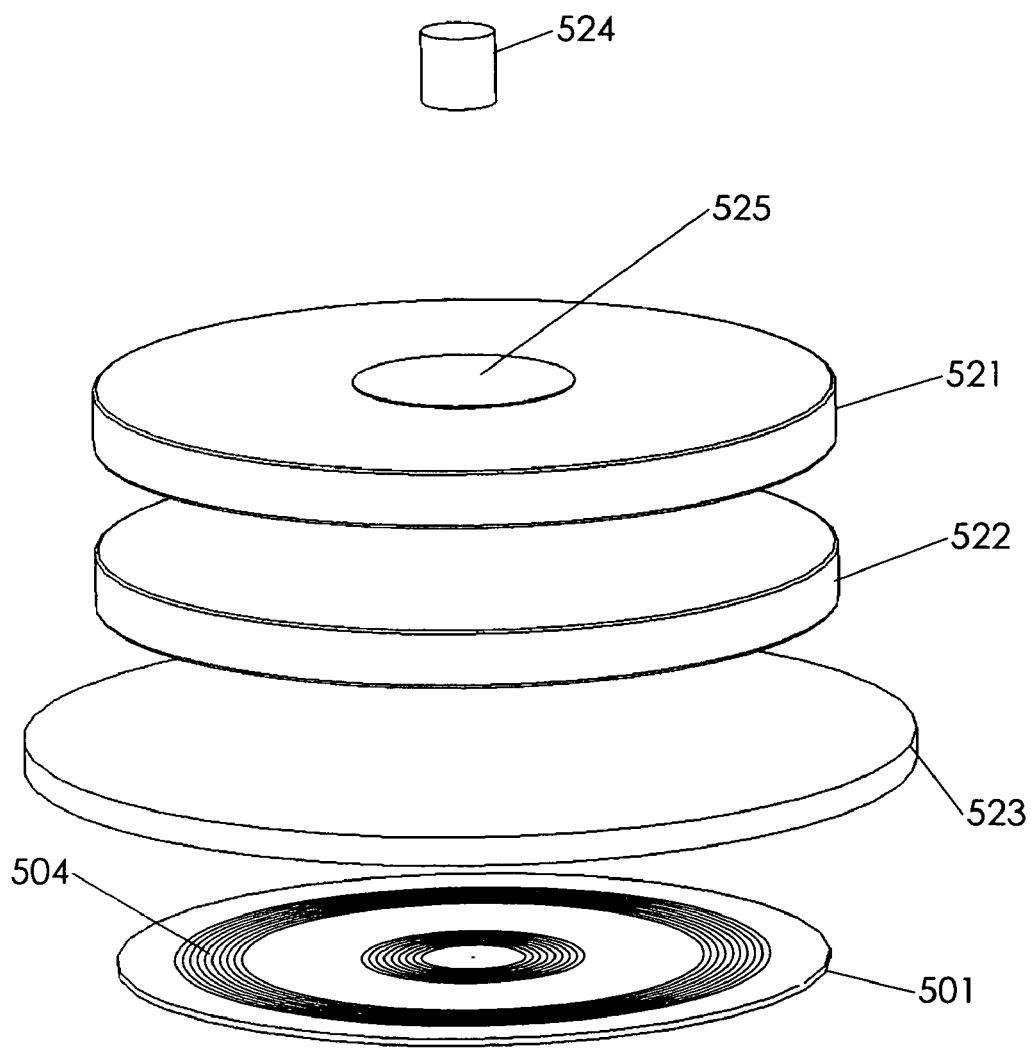
FIG. 30 is a perpective view if a Fabry-Perot-based apparatus alternatively used for forming a planar VHF-BR-based cavity.

In FIG. 30, a Fabry-Perot cavity is utilized to image the ring pattern of the desired VHF-BR, wherein an UV point light source (524) is used to provide a spherically expanding wavefront. A first Fabry-Perot plate (521) and second Fabry-Perot plate (522) form a resonant cavity for creating optical interference in the form of a concentric pattern of circular virtual fringes, which is made into an imaged pattern of real fringes on the dielectric cavity layer (503) by optical imaging means (523) that comprise conventional optical assemblies used for imaging virtual fringes into real imaged fringes. An optical stop (525) may be used to define the region on the substrate (501) that is to be patterned. Such imaged fringes may be used to provide modification of the cavity layer in the same manner as the scanned UV light of the previous embodiment.

In one embodiment, the wafer-based optical resonator can be further processed to provide an additional layer of silicon over the dielectric layer in which the VHF-BR resides. This silicon layer is preferably a mono-crystalline layer that is bonded to the dielectric layer by means of silicon-on-insulator (SOI) fabrication methods described and used for producing SOI substrates. A preferred SOI process is SOITEC's Smartcut™ and related processes, wherein the silicon layer is formed by optically contacting the silicon layer to the dielectric layer. SOITEC's process is an example of a preferred process for producing the currently embodied SOI substrate, since it is well-known to form a suitable silicon layer over a wide variety of dielectric materials, which may or may not have an underlying substrate composed of silicon. Such SOI processing methods also provide for optically contacting the Si cap layer to the insulator layer in ways that do not require excessive temperatures that may distort the VHF-BR. Once the silicon layer is formed by a suitable SOI process, semiconductor circuitry and devices may then be formed within and adjacent to the silicon layer as normally performed in the semiconductor industry. Thus the disclosed VHF-BR-based resonator may be incorporated into an SOI substrate that may be applied to other SOI applications. Various devices that may be fabricated in the presently discussed SOI substrate include semiconductor-based emitters such as light-emitting diodes that may be utilized for pumping of the underlying gain volume.

Figure 31:
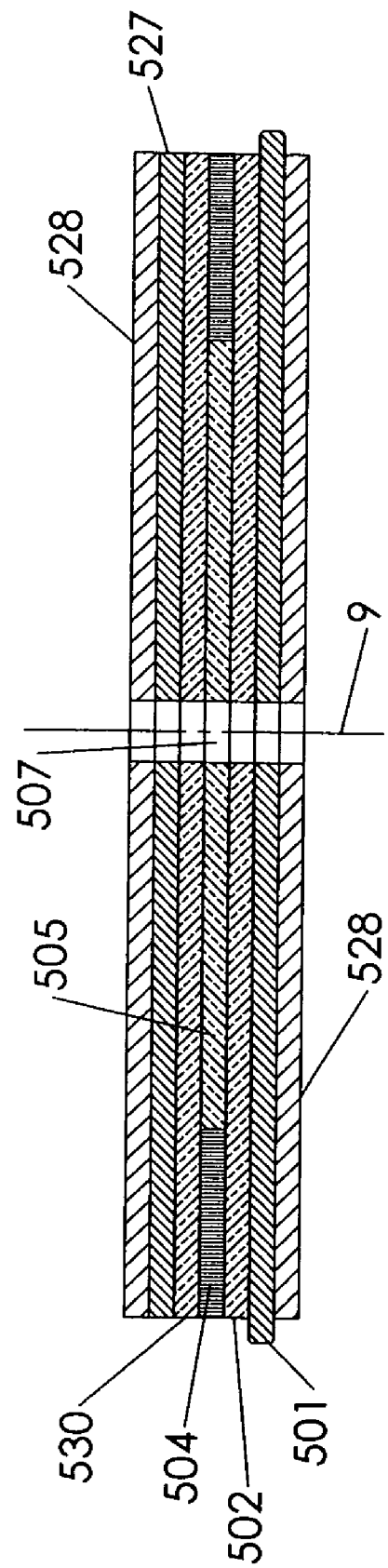
FIG. 31 is a sectional side-view of the planar VHF-BR-based cavity of FIG. 26, further comprising SOI and heat-sinking layers.

In FIG. 31, a SOI substrate incorporating a VHF-BR-based cavity is integrated into a SOI substrate that includes a second clad layer (530) and a silicon capping layer (527) that is preferably single-crystalline, but may be polycrystalline or amorphous. The structure in FIG. 31 also includes cooling means (531) that is a planar layer (or plate) that provides high thermal conductivity to a heat-sinking means, such as thermoelectric or fluid cooling. The structure may alternatively provide a central bore (507) wherein central outcoupling structures may be positioned.

Figure 32:
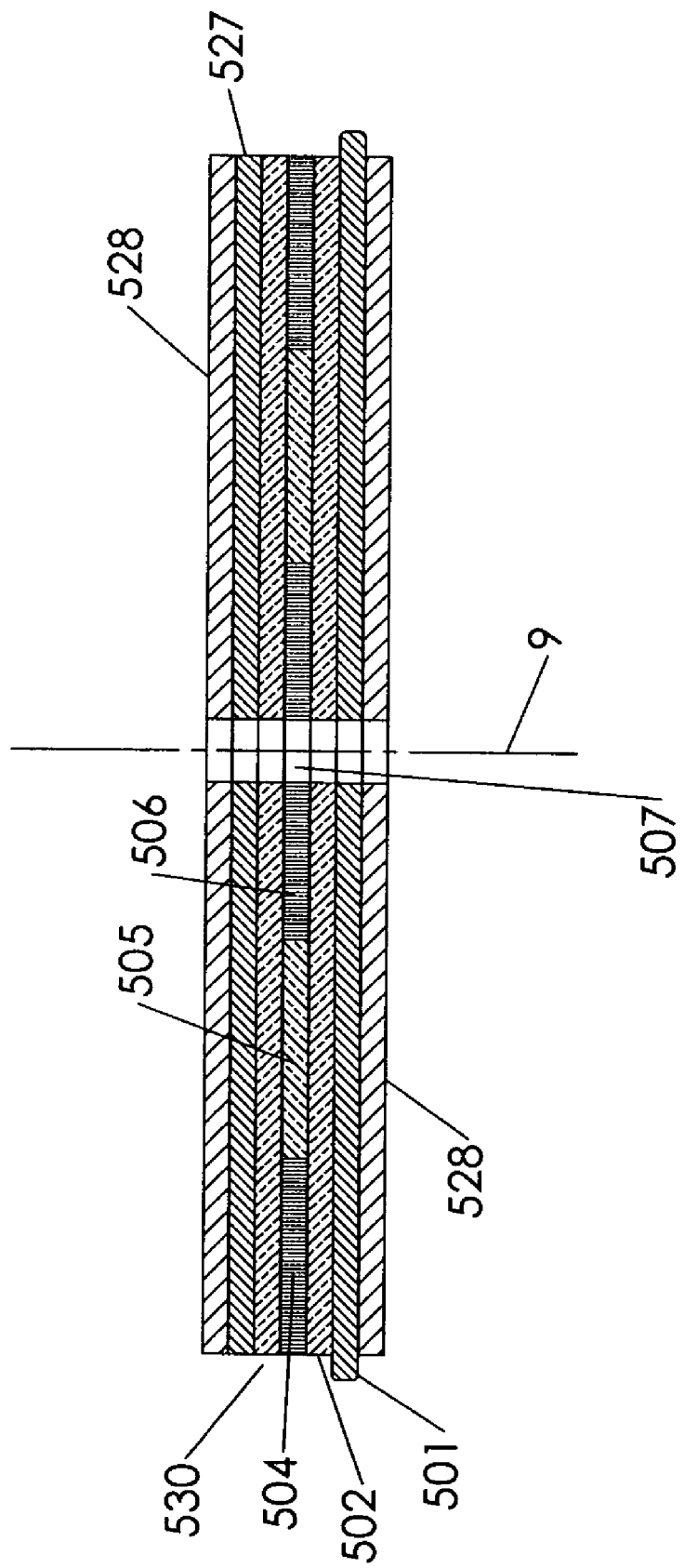
FIG. 32 is a sectional side-view of the planar double-VHF-BR-based cavity of FIG. 27, further comprising SOI and heat-sinking layers.

In FIG. 32 a double-VHF-BR-based cavity may similarly be incorporated into an SOI substrate. In this embodiment, outcoupling of light from the cavity may be realized through either the inner VHF-BR (506) or the outer VHF-BR (504). Coupling from the outer VHF-BR may be achieved either by the modified outcoupler (532) of FIG. 27, or by forming the outer VHF-BR with fewer layers than the inner VHF-BR, so that transmission is greater through the outer VHF-BR.

In the present embodiment, a silicon wafer may be utilized to form a high-purity $SiO_2$ layer by means of thermal oxidation, as is commonplace in semiconductor manufacturing.

The planar substrate may alternatively be means for eliminating unwanted light propagation within the cavity by allowing such unwanted propagation to exit through the planar substrate. Alternatively, a the planar substrate may comprise materials that are transmissive to a desired pump wavelength, so that the VHF-BR-based cavity can be pumped through the planar substrate.

Figure 33:
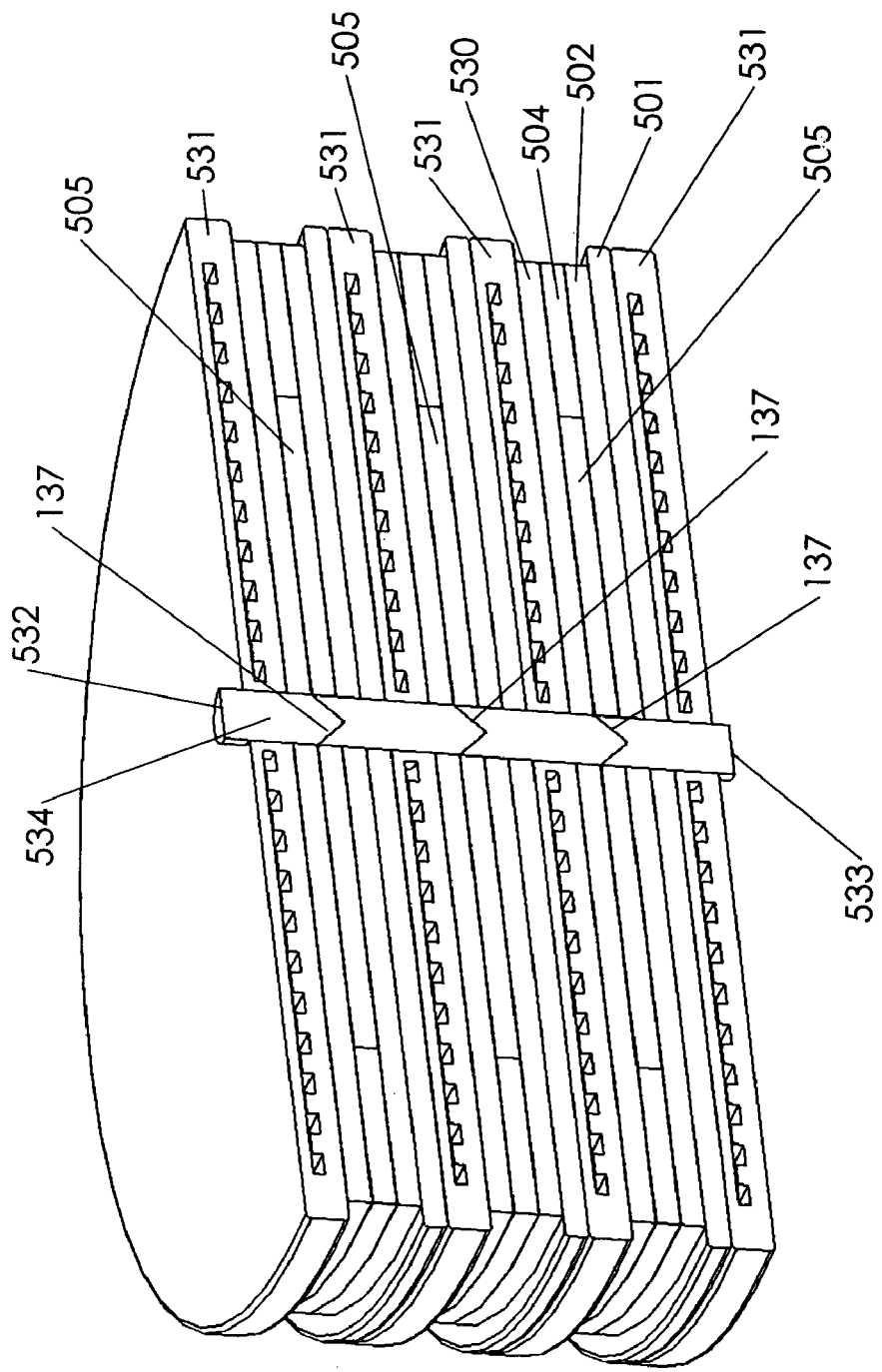
FIG. 33 is a perspective cut-away view of a laser apparatus comprising several stacked planar VHF-BR-based cavities, taken along central axis (9).

It should be recognized that the planar substrate (501) may be suitably made from of a variety of materials. Such materials may comprise an amorphous, polycrystalline, or single-crystalline material. The thin-cavity substrate may be either transparent or opaque to various radiation utilized in the disclose laser cavity, such as the pump or gain wavelengths. For example, the planar substrate may comprise a fused silica wafer, with a high-index cladding layer preferably formed over its planar surface. The use of a fused silica wafer as the planar substrate is an alternative embodiment that is particularly suited for the use of the disclosed VHF-BR-based cavity in stacked arrays of optically pumped amplifiers, wherein the amplifiers comprise the centrally-coupled VHF-BR-based amplifiers of FIG. 31 that are incorporated into the optical path of a laser. Such an embodiment is provided, in FIG. 33, through the use of a retro-reflection structure (534) comprising a fused silica cylindrical rod that incorporates a plurality of retroreflective conical reflectors (138), wherein the conical reflectors are not metallic as in previous embodiments, but are semi-reflecting surfaces comprising all-dielectric materials, so that the individual VHF-BR-based cavities, in FIG. 33, are optically coupled. The ends of the cylindrical rod are preferably coated with outcoupler (532) and high-reflectance mirror (533), so that a laser cavity is formed by the coupled VHF-BR-based amplifiers.

Various precision optics suppliers can provide conical optics, in FIG. 33. The individual conical reflectors in FIG. 33 are preferably formed by first fabricating elements with mating conical surfaces, second, coating one mating face of the mating elements with a dielectric reflector, and, third, mating the mating elements to form the retroreflection structure. Alternatively, the conical reflectors may be formed through laser modification of a single glass rod, using laser maching methods used for forming precision conical surfaces within the glass rod. Other retroreflective cone structures may also be implemented, and outcoupler and high-reflectance mirrors may be separate elements. Alternatively, the double-VHF-BR-based cavity of FIG. 32 could be used in a stacked array.

The substrates (501) and cooling plates (531) are preferably transparent to pump radiation when optical face-pumping is desired in a stacked configuration.

Figure 34:
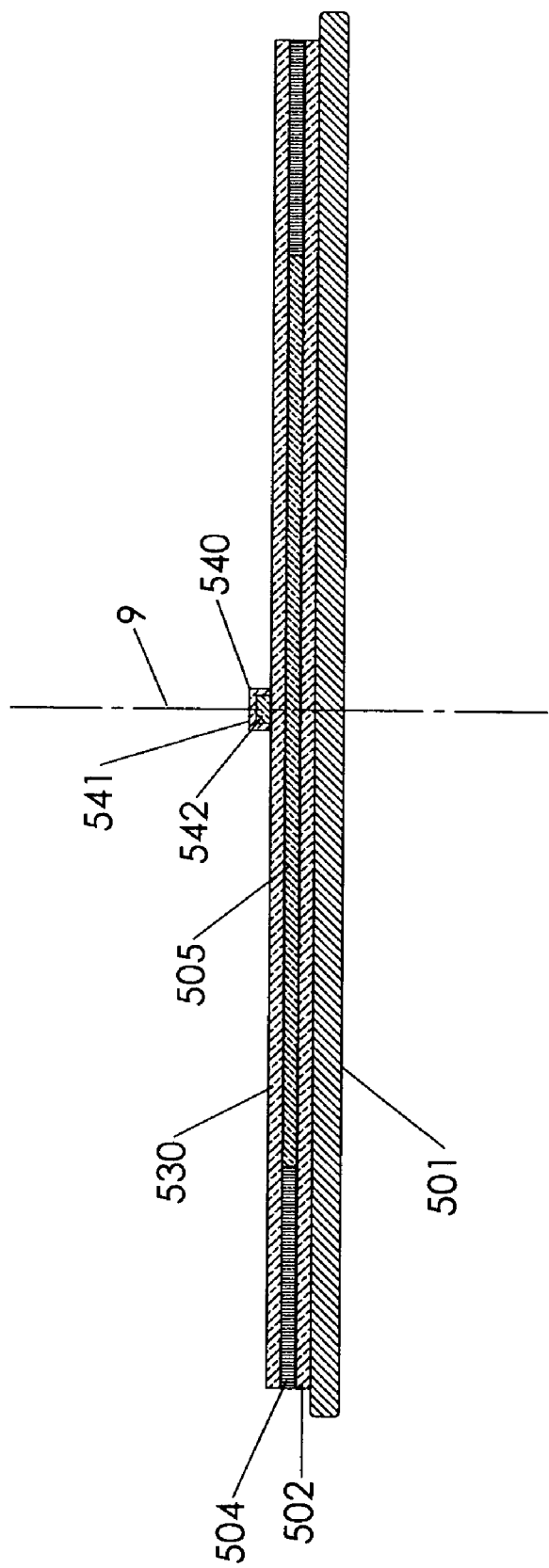
FIG. 34 is a sectional side-view of a planar VHF-BR-based cavity with an integrated waveguide.

A waveguide structure (540) may be integrated into the disclosed planar VHF-BR-based cavity, in FIG. 34. In embodiments providing a SOI substrate, regions of the silicon cap layer are removed so that a waveguide structure (540) may be positioned adjacent to the VHF-BR-based cavity. The waveguide core (542) and waveguide cladding (541) are preferably positioned to allow evanescent coupling between the waveguide core and the gain volume (505) of a VHF-BR-based cavity.

Figure 35:
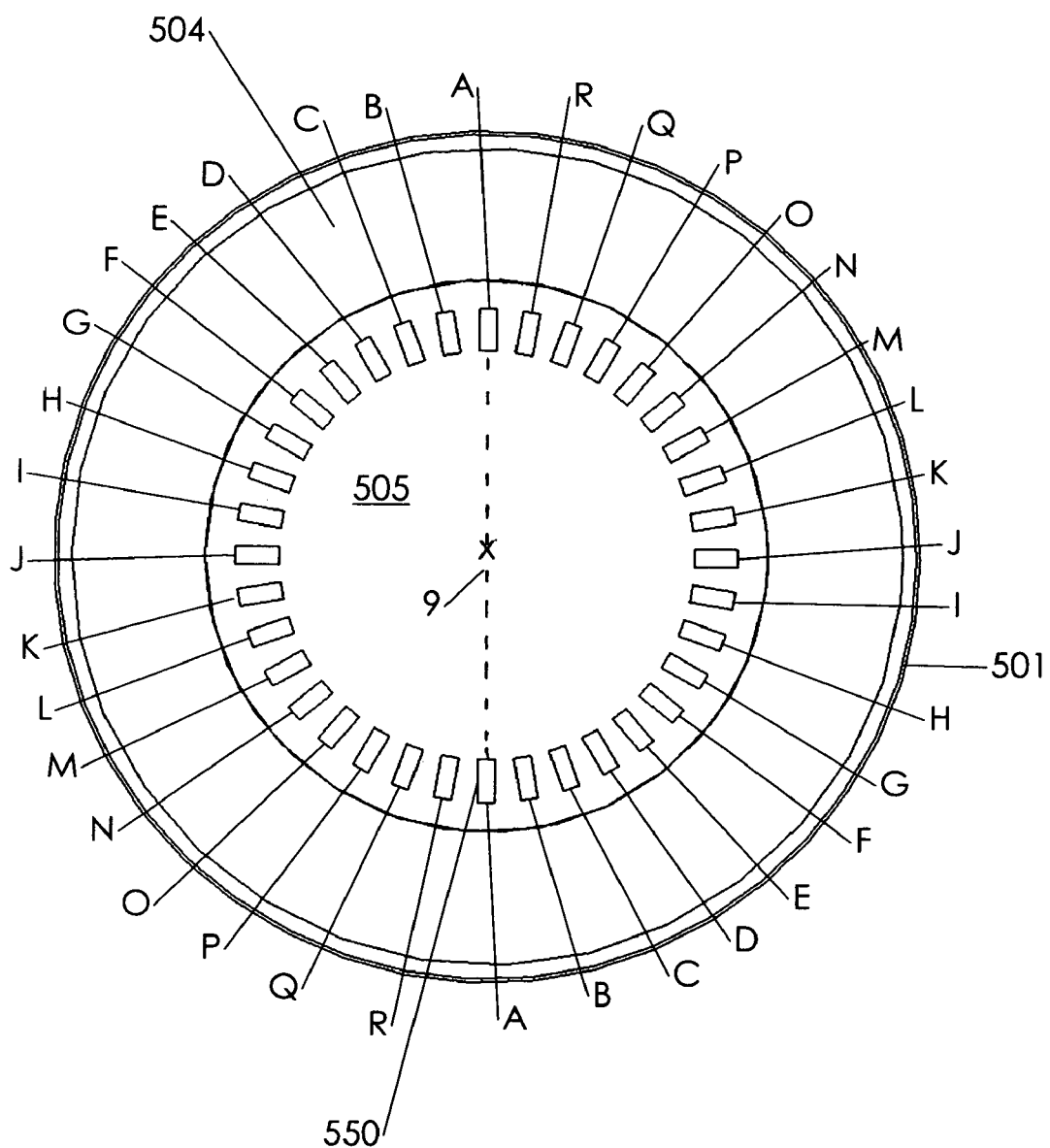
FIG. 35 is a top-view of a planar VHF-BR-based cavity with a multitude of pump sources.
Figure 36:
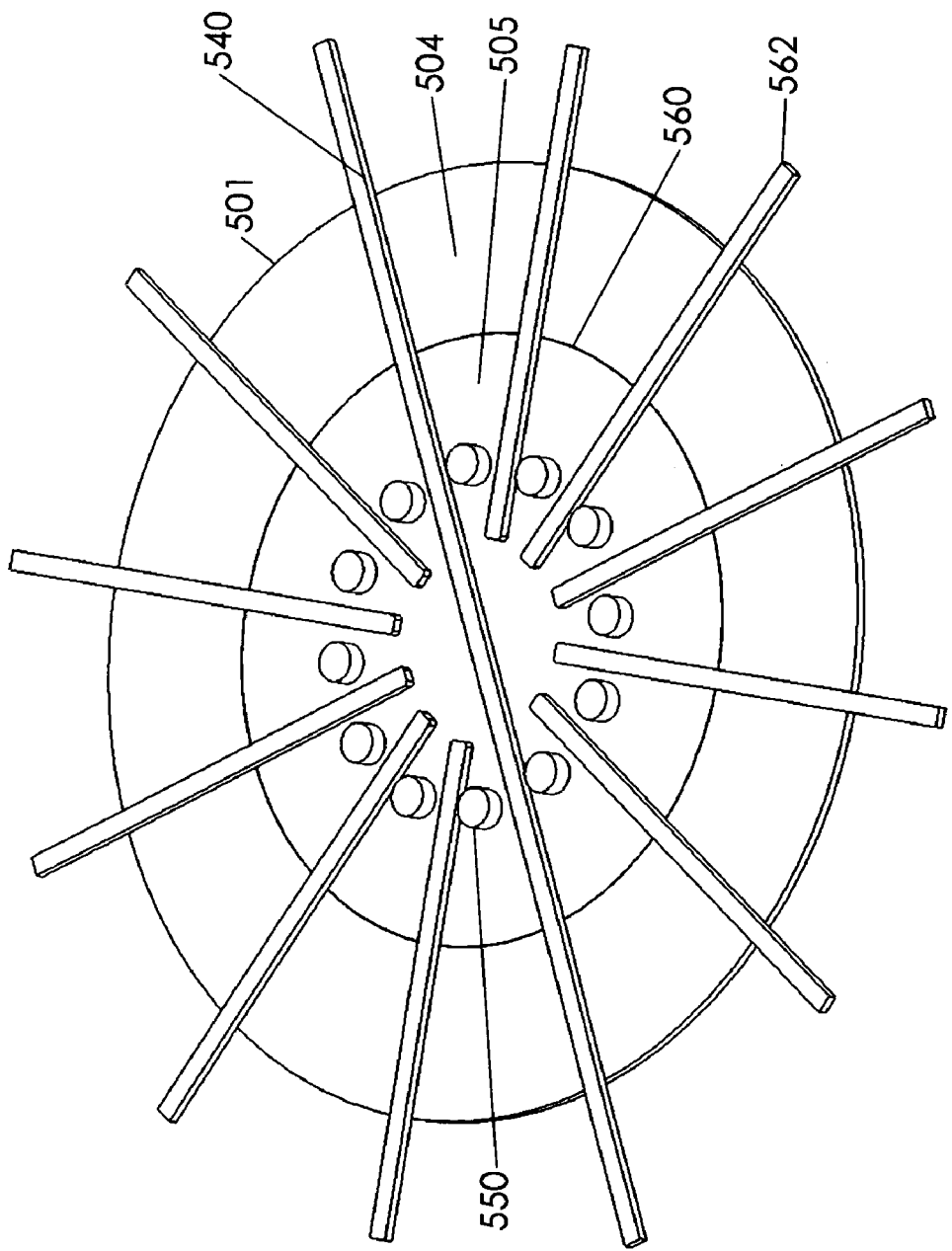
FIG. 36 is a perspective view of a planar VHF-BR-based cavity incorporating several pump sources and waveguides.

In a further embodiment, a multitude of light emitting diodes, preferably laser diodes, are symmetrically positioned over the dielectric layer, in FIG. 35, so that a radially symmetric pattern of pump sources is produced. In this particular embodiment, pump sources (550) are located over the gain volume (505) and inside the inner diameter of the VHF-BR region (504). Accordingly, a separate gain region may be attributed to each portion of the gain volume immediately underlying each pump source, so that a multitude of gain regions result.

Such a radial pattern of pump sources may be produced by a variety of means, including that of attaching individual pump modules to the dielectric layer. The symmetric pattern of pump sources provide particular advantages when used in conjunction with the disclosed VHF-BR-based resonator, in that this multitude of pump sources may be operated so that an intensity of pump radiation produced by each pump source is varied with time, so that pump radiation is provided around the gain volume of the VHF-BR-based resonator in a sequential manner.

Since the various traveling and standing modes that may be supported by a particular resonator of the invention will each have a different characteristic frequency, $\omega_c$, with which photons travel full revolutions around the cavity, one of these modes may be preferentially amplified by the pump sources by oscillating the multitude of pump sources in concert with a particular desired mode. For example, in conjunction with the embodiments of FIG. 3, it may be seen that a plurality of modes may be supported within the solid cone of reflection $\Delta\theta_r$, within which modes are reflected with adequate reflectivity to allow amplification. Aside from the magnitude of $\Delta\theta_r$, the number of modes allowed by this solid cone of reflection will also depend on such other variables as the radius, r, of the cavity, and the mode wavelength, $\lambda_c$. Thus, given the wide range of possible values for these variables, the frequencies, $\omega_c$, attributable to walking or stationary modes may have values ranging over many orders of magnitude, ranging from several hertz to many GHz.

In FIG. 35, the pump sources are positioned in opposing pairs about the cavity gain region, so that a ring-shaped array comprising a multitude of pump sources is embodied. The pairs of pump sources are sequentially labelled as 'A', 'B', 'C', and so on, up to 'R'. In the present embodiment, these pump pairs are energized to emit optical power in an accordingly sequential order, so that the gain volume is pumped in a circularly oscillating manner. This may be accomplished by providing a sine-wave power to each of the pump pairs, wherein the phase of the sine-wave is shifted incrementally by an equal phase angle at each successive pump pair, relative to the last.

For example, if light traveling within a desired mode returns upon its path in $1\times10^{-7}$ seconds, so that $\omega_c=1\times10^7$ Hz, then such a mode may be preferentially pumped by the pump sources when the pump pairs 'A' through 'T' are cycled at an equivalent frequency of $1\times10^7$ sec$^{-1}$. Such resonant pumping may be implemented in a wide variety of combinations that are less localized. For example, cycling at the same frequency may be performed synchronously to each successive set of three pump pairs, [ABC], [DEF], [GHI], [JKL], [MNO], and [PQR], wherein each set is cycled (e.g., ABCABCAB CA . . . ) with the desired frequency, $\omega_c$, and so that A, D, G, J, M, and P, are in phase. It is furthermore apparent, then, that the choice of order in cycling the pump sources—i.e., whether the order is [ABCABCA . . . ] or [CBACB AC . . . ]—will effect as to whether, so resonantly pumped, propagating light in the cavity is traveling in a clockwise or counterclockwise rotation. Such resonant pumping schemes may be utilized to create helical beam paths when utilized in conjunction with conically-coupled embodiments of this disclosure. Thus, such cyclical powering of the pump sources provide an additional mode-selection means, in addition to the mode-selection means provided by the high finesse of the VHF-BR. Also, there may be occurences wherein light propagation within the cavity is not within a stationary mode of the cavity, yet is still amplified by the gain material, so that the VHF-BR-based cavity of the present embodiment may essentially act as an optical amplifier for an injected signal. In this embodiment, an injected signal may thus be used to modulate gain of the normal cavity modes.

Such cyclical pumping may be performed in accordance with various alternative embodiments, such as wherein the circular array of pump sources are cyclically pumped with more than one cycle frequency so as to pump more than one mode, produce a beat frequency, promote a particular harmonic, etc. In one alternative embodiment Various devices may be contemplated using the principles and structures set forth herein. For instance, in FIG. 36, several waveguides might be positioned to evanescently or directly communicate with the planar VHF-BR-based cavities of FIGS. 26-36.

INDUSTRIAL APPLICATIONS

The present invention is seen to have potential applications in several areas. One such application would be in the treatment of optical fibers or optical fiber preforms, where the fiber or preform could be passed through the center of a laser cavity similar to that described in FIG. 3. Another potential application could arise in the general field of vapor deposition, where various vapors or gases might be ionized, heated, or otherwise altered by passing through the process volume of FIG. 3.

Other uses are suited to embodiments of the invention wherein telescopic optics are used to centrally couple optical energy from the cavity center. The latter embodiments would be useful in any application wherein a laser beam is required, such as in telecommunications.

One could extrapolate from the discused VHF-BR to propose an ultra-high finesse (UHF) Bragg reflector, having yet higher finesse than those reflectors contemplated herein. However, such further refinements would not substantially alter the novel operational principles set forth herein, and would therefore comprise, in this context, a subset of VHF-BR's.

Also, layers of the VHF-BR need not be precisely quarter-wave, since very small cavities may benefit from the implementation of Bessel-type distributions of layer thickness. Furthermore, solid state disk and slab cavities of the present invention may be pumped in any of the appropriate configurations discussed in the prior art, including, but not limited to edge-pumping and face-pumping.

The preceding description provides an laser cavity structure that may be operated as a laser, optical amplifier, or other, optically resonating, device. Although the present invention has been described in detail with reference to the embodiments shown in the drawings, it is not intended that the invention be restricted to such embodiments. It will be apparent to one practiced in the art that various departures from the foregoing description and drawings may be made without departure from the scope or spirit of the invention.

Numbered elements in FIGS.:
(1) substrate
(2) normal-incidence reflected intensity
(3) oblique-incidence reflected intensity
(4) cavity interior
(5) VHF-BR reflector
(6) Off-normal propagation
(7) Confined propagation
(8), tube
(9) axis of circular symmetry
(14) low index layer
(15) high index layer
(16) FWHM
(17) process volume
(18) dashed lines
(19) topmost high-index layer
(49) topmost layer
(125) gain volume
(136) cone interior
(137) conical reflecting surface
(138) outcoupler mirror
(139) secondary reflector
(140) primary reflector
(141) central aperture
(142) optics housing structure
(143) primary reflector surface
(144) first annular flange
(145) second annular flange
(147) process space
(148) workpiece
(149) lateral axis
(150) electrode insulator
(151) first annular electrode (152) second annular electrode
(153) electrode power lead
(154) gas inlet
(155) gas outlet
(156) cylindrical outcoupler
(157) cylindrical outcoupler coating
(159) annular field intensity
(160) process port
(201) annular solid state medium
(203) reflective coating
(204) pump source
(205) first cooling element
(206) second cooling element
(207) pump housing structure
(208) pump guiding structure
(209) cylindrical outcoupling surface
(210) pump light conduit
(211) central optical structure
(214) intermediate layer
(300) solid state slab module
(301) rectangular gain medium
(302) outcoupling mirror
(303) axis across thickness dimension
(304) vertical axis
(307) pumping/cooling plate
(308) intermediate layer
(309) lateral axis
(310) absorbing layer
(311) vertical axis
(315) non-preferred mode
(317) high-reflectance mirror
(318) Brewster window
(319) outcoupler mirror
(320) beamsplitter mirror
(321) beamsplitter high-reflectance mirror
(322) beam path
(401) flexible organic substrate
(501) planar substrate
(502) substrate clad layer
(503) dielectric cavity layer
(504) VHF-BR
(505) gain volume
(506) second bragg reflector
(507) cylindrical hole
(508) extra-cavity region
(510) UV laser scanner
(511) scanned laser beam
(512) rotating wafer chuck
(521) first Fabry-Perot plate
(522) second Fabry-Perot plate
(523) imaging means
(524) UV point light source
(525) optical stop
(527) Si layer
(530) second clad layer
(531) cooling plate
(532) outcoupler mirror
(533) high-reflectance mirror
(534) retroreflection structure
(540) waveguide
(541) waveguide cladding
(542) waveguide core
(550) pump source
(560) division line
(562) secondary waveguide

What is claimed is:

1. A cavity structure for providing light amplification, comprising:
   a.) a cavity structure providing a surface-of-revolution;
   b.) a multilayer dielectric reflector formed on the surface of revolution, the reflector forming an optically resonant cavity with resonant modes;
   c.) means for providing an excimer-based gain medium within the optical cavity;
   d.) a first annular electrode substantially concentric to the surface-of-revolution, the first electrode having a first electrode surface adjacent the cavity; and,
   e.) a second annular electrode substantially concentric to the surface-of-revolution, the second electrode having a second electrode surface adjacent to the cavity and opposite the first electrode surface, so that the gain medium is excited when power is provided to the first and second electrode.

2. A laser apparatus, comprising:
   a.) an optical cavity structure having a surface of revolution;
   b.) a reflector structure adjacent to the surface of revolution, the reflector structure conforming to the surface of revolution, the reflector structure comprising at least one hundred dielectric layers, the layers comprising layers of alternating refractive indices, such that adjacent layers have a difference in refractive index, $\Delta n$, wherein $0<\Delta n<0.1$, the reflector structure forming an optical cavity with optical modes;
   c.) means for providing an excimer-based gain medium within the optical cavity; and,
   d.) means for pumping the gain medium, so that the gain medium emits an optical energy corresponding to the modes.

3. A laser structure for providing laser emission, comprising:
   a.) a cavity structure having a surface, the surface conforming to a surface of revolution;
   b.) a layered dielectric reflector adjacent to and conforming to the surface, the reflector forming an optical cavity for providing modes of the laser emission;
   c.) means for providing an excimer gain medium within the optical cavity;
   d.) pumping means positioned for pumping the gain medium, the pumping means comprising a substantially circular array of excitation structures, the array of excitation structures for exciting the gain medium, the array of excitation structures positioned substantially concentric to the surface of revolution, so that the gain medium emits optical energy when excited by the excitation structures.

4. The laser apparatus of claim 2, wherein the excimer-based gain medium is a gas having a composition including a gas selected from the group consisting of fluorine, chlorine, bromine, and iodine.

5. The laser apparatus of claim 2, wherein the surface of revolution is discontinuous.

6. The laser apparatus of claim 2, wherein the surface of revolution is a spherical surface.

7. The laser apparatus of claim 2, wherein the surface of revolution is a cylindrical surface.

8. The laser apparatus of claim 2, wherein a substantially conical reflector is used for directing optical energy out of the cavity.

9. The laser apparatus of claim 2, wherein the apparatus is used to irradiate an optical fiber.

10. The laser apparatus of claim 2, wherein the apparatus is used to irradiate a photo-absorbing medium that is passed through the cavity.

11. The laser apparatus of claim 2, wherein the apparatus is used to irradiate a spherical target for energy production.

12. The laser apparatus of claim 2, wherein the reflector structure is discontinuous.

13. The laser apparatus of claim 2, wherein the apparatus is a multi-mode source.

14. The laser apparatus of claim 2, wherein the apparatus comprises a high-brightness source.

15. The laser apparatus of claim 2, wherein a region on the surface of revolution corresponds to a region of lowered reflectivity for coupling energy out of the cavity through the surface of revolution.

16. The laser apparatus of claim 2, wherein the modes are non-stationary.

17. The laser apparatus of claim 2, wherein the means for pumping comprises a discharge.

18. The laser apparatus of claim 2, wherein the reflector structure is formed by sequential deposition of layers.

19. The laser apparatus of claim 2, wherein the reflector structure is formed by modulating a refractive index in a preformed material.

20. The laser apparatus of claim 2, wherein the reflector structure is formed by a vapor deposition method.

* * * * *